(12) United States Patent
Tomikawa et al.

(10) Patent No.: US 7,936,531 B2
(45) Date of Patent: May 3, 2011

(54) THERMALLY ASSISTED MAGNETIC HEAD HAVING AN ASYMMETRIC PLASMON ANTENNA AND MANUFACTURING METHOD THEREOF

(75) Inventors: Satoshi Tomikawa, Tokyo (JP); Seiichi Takayama, Tokyo (JP); Koji Shimazawa, Tokyo (JP)

(73) Assignee: TDK Corporation, Tokyo (JP)

( * ) Notice: Subject to any disclaimer, the term of this patent is extended or adjusted under 35 U.S.C. 154(b) by 356 days.

(21) Appl. No.: 12/267,126

(22) Filed: Nov. 7, 2008

(65) Prior Publication Data
US 2010/0118431 A1    May 13, 2010

(51) Int. Cl.
*G11B 5/02* (2006.01)
*G11B 11/00* (2006.01)

(52) U.S. Cl. .................. 360/59; 369/13.33; 369/13.13

(58) Field of Classification Search ............ 369/13.33, 369/13.13, 13.32, 13.17, 13.24, 112.09, 112.14, 369/112.21; 360/59, 128; 216/22
See application file for complete search history.

(56) References Cited

U.S. PATENT DOCUMENTS

| | | | |
|---|---|---|---|
| 6,649,894 B2 * | 11/2003 | Matsumoto et al. | 250/201.3 |
| 6,768,556 B1 * | 7/2004 | Matsumoto et al. | 356/601 |
| 7,821,732 B2 * | 10/2010 | Komura et al. | 360/59 |
| 7,835,101 B2 * | 11/2010 | Takayama et al. | 360/59 |
| 2010/0073802 A1 * | 3/2010 | Komura et al. | 360/59 |

FOREIGN PATENT DOCUMENTS

| | | |
|---|---|---|
| JP | A-2001-255254 | 9/2001 |
| JP | A-2003-4622 | 1/2003 |
| JP | A-2003-114184 | 4/2003 |
| JP | A-2003-203304 | 7/2003 |
| JP | A-2006-185548 | 7/2006 |

\* cited by examiner

*Primary Examiner* — Ali Neyzari
(74) *Attorney, Agent, or Firm* — Oliff & Berridge, PLC

(57) ABSTRACT

The thermally assisted magnetic head according to the present invention comprises a medium-facing surface, a main magnetic pole provided on the medium-facing surface, and a plasmon antenna provided on the medium-facing surface, in the vicinity of the main magnetic pole. The shape of the plasmon antenna, as viewed from a direction perpendicular to the medium-facing surface, is a triangle having first, second and third corners, the plasmon antenna being shaped as a flat plate the thickness direction of which is perpendicular to the medium-facing surface. The distance from the first corner to the main magnetic pole is shorter than the distance from the second corner to the main magnetic pole and the distance from the third corner to the main magnetic pole. The second corner and the third corner are rounded.

9 Claims, 42 Drawing Sheets

*Fig.21*

|  | RADIUS OF CURVATURE [nm] | α [deg] | β [deg] | γ [deg] | SIDE AB [nm] | MATERIAL |
|---|---|---|---|---|---|---|
| COMPARATIVE EXAMPLE 1 | 0 | 60 | 60 | 60 | 100 | Au |
| EXAMPLE 1 | 10 | 60 | 60 | 60 | 100 | Au |
| EXAMPLE 2 | 15 | 60 | 60 | 60 | 100 | Au |
| EXAMPLE 3 | 20 | 60 | 60 | 60 | 100 | Au |
| EXAMPLE 4 | 25 | 60 | 60 | 60 | 100 | Au |
| EXAMPLE 5 | 30 | 60 | 60 | 60 | 100 | Au |

*Fig.24*

|  | RADIUS OF CURVATURE [nm] | α [deg] | β [deg] | γ [deg] | SIDE AB [nm] | MATERIAL |
|---|---|---|---|---|---|---|
| COMPARATIVE EXAMPLE 2 | 0 | 60 | 60 | 60 | 100 | Ag |
| EXAMPLE 6 | 10 | 60 | 60 | 60 | 100 | Ag |
| EXAMPLE 7 | 15 | 60 | 60 | 60 | 100 | Ag |
| EXAMPLE 8 | 20 | 60 | 60 | 60 | 100 | Ag |
| EXAMPLE 9 | 25 | 60 | 60 | 60 | 100 | Ag |
| EXAMPLE 10 | 30 | 60 | 60 | 60 | 100 | Ag |

Fig.27

|  | RADIUS OF CURVATURE [nm] | α [deg] | β [deg] | γ [deg] | SIDE AB [nm] | MATERIAL |
|---|---|---|---|---|---|---|
| COMPARATIVE EXAMPLE 3 | 0 | 30 | 75 | 75 | 150 | Au |
| EXAMPLE 11 | 10 | 30 | 75 | 75 | 150 | Au |
| EXAMPLE 12 | 15 | 30 | 75 | 75 | 150 | Au |
| EXAMPLE 13 | 20 | 30 | 75 | 75 | 150 | Au |
| EXAMPLE 14 | 25 | 30 | 75 | 75 | 150 | Au |
| EXAMPLE 15 | 30 | 30 | 75 | 75 | 150 | Au |

Fig.32

| | RADIUS OF CURVATURE [nm] | α [deg] | β [deg] | γ [deg] | SIDE AB [nm] | MATERIAL |
|---|---|---|---|---|---|---|
| COMPARATIVE EXAMPLE 3 | 0 | 30 | 75 | 75 | 150 | Au |
| COMPARATIVE EXAMPLE 4 | 0 | 30 | 70 | 80 | 150 | Au |
| COMPARATIVE EXAMPLE 5 | 0 | 30 | 65 | 85 | 150 | Au |
| EXAMPLE 11 | 10 | 30 | 75 | 75 | 150 | Au |
| EXAMPLE 16 | 10 | 30 | 70 | 80 | 150 | Au |
| EXAMPLE 17 | 10 | 30 | 65 | 85 | 150 | Au |

*Fig.38*

|  | RADIUS OF CURVATURE [nm] | α [deg] | β [deg] | γ [deg] | SIDE AB [nm] | MATERIAL |
|---|---|---|---|---|---|---|
| EXAMPLE 18 | 10 | 20 | 80 | 80 | 150 | Au |
| EXAMPLE 19 | 10 | 20 | 75 | 85 | 150 | Au |
| EXAMPLE 20 | 10 | 20 | 70 | 90 | 150 | Au |
| EXAMPLE 11 | 10 | 30 | 75 | 75 | 150 | Au |
| EXAMPLE 16 | 10 | 30 | 70 | 80 | 150 | Au |
| EXAMPLE 17 | 10 | 30 | 65 | 85 | 150 | Au |
| EXAMPLE 21 | 10 | 30 | 60 | 90 | 150 | Au |

Fig.39

|  | RADIUS OF CURVATURE [nm] | α [deg] | β [deg] | γ [deg] | SIDE AB [nm] | MATERIAL |
|---|---|---|---|---|---|---|
| EXAMPLE 22 | 10 | 45 | 67.5 | 67.5 | 150 | Au |
| EXAMPLE 23 | 10 | 45 | 65 | 70 | 150 | Au |
| EXAMPLE 24 | 10 | 45 | 60 | 75 | 150 | Au |
| EXAMPLE 25 | 10 | 45 | 55 | 80 | 150 | Au |
| EXAMPLE 26 | 10 | 45 | 50 | 85 | 150 | Au |
| EXAMPLE 27 | 10 | 45 | 45 | 90 | 150 | Au |
| EXAMPLE 28 | 10 | 55 | 62.5 | 62.5 | 150 | Au |
| EXAMPLE 29 | 10 | 55 | 60 | 65 | 150 | Au |
| EXAMPLE 30 | 10 | 55 | 55 | 70 | 150 | Au |

Fig.40

|  | RADIUS OF CURVATURE [nm] | α [deg] | β [deg] | γ [deg] | SIDE AB [nm] | MATERIAL |
|---|---|---|---|---|---|---|
| EXAMPLE 31 | 10 | 20 | 80 | 80 | 150 | Ag |
| EXAMPLE 32 | 10 | 20 | 75 | 85 | 150 | Ag |
| EXAMPLE 33 | 10 | 20 | 70 | 90 | 150 | Ag |
| EXAMPLE 34 | 10 | 30 | 75 | 75 | 150 | Ag |
| EXAMPLE 35 | 10 | 30 | 70 | 80 | 150 | Ag |
| EXAMPLE 36 | 10 | 30 | 65 | 85 | 150 | Ag |
| EXAMPLE 37 | 10 | 30 | 60 | 90 | 150 | Ag |

*Fig.41*

|  | RADIUS OF CURVATURE [nm] | α [deg] | β [deg] | γ [deg] | SIDE AB [nm] | MATERIAL |
|---|---|---|---|---|---|---|
| EXAMPLE 38 | 10 | 45 | 67.5 | 67.5 | 150 | Ag |
| EXAMPLE 39 | 10 | 45 | 65 | 70 | 150 | Ag |
| EXAMPLE 40 | 10 | 45 | 60 | 75 | 150 | Ag |
| EXAMPLE 41 | 10 | 45 | 55 | 80 | 150 | Ag |
| EXAMPLE 42 | 10 | 45 | 50 | 85 | 150 | Ag |
| EXAMPLE 43 | 10 | 45 | 45 | 90 | 150 | Ag |
| EXAMPLE 44 | 10 | 55 | 62.5 | 62.5 | 150 | Ag |
| EXAMPLE 45 | 10 | 55 | 60 | 65 | 150 | Ag |
| EXAMPLE 46 | 10 | 55 | 55 | 70 | 150 | Ag |

THERMALLY ASSISTED MAGNETIC HEAD HAVING AN ASYMMETRIC PLASMON ANTENNA AND MANUFACTURING METHOD THEREOF

BACKGROUND OF THE INVENTION

1. Field of the Invention

The present invention relates to a thermally assisted magnetic head having an asymmetric plasmon antenna, a head gimbal assembly and a hard disk drive, and to a method for manufacturing a thermally assisted magnetic head having an asymmetric plasmon antenna.

2. Related Background Art

Thin-film magnetic heads must deliver ever greater performance to cope with higher recording densities in hard disk drives. Widely used thin-film magnetic heads include composite thin-film magnetic heads having a multilayer structure comprising, for instance, a magnetic sensing element such as a magnetoresistive (MR) effect element and a magnetic recording element such as an electromagnetic coil element. These elements write and read data signals to/from a magnetic disk, which is a magnetic recording medium.

The magnetic recording medium is normally a so-called discontinuous medium having a structure in which magnetic microparticles are aggregated, each magnetic microparticle constituting a single domain structure. One recording bit comprises a plurality of magnetic microparticles. In order to enhance recording density, therefore, the magnetic microparticles must be made smaller, and the irregularities at the boundaries between recording bits must be reduced. Reducing the size of magnetic microparticles, however, is problematic in that reduction in particle volume is accompanied by a drop in magnetization thermal stability.

The factor $K_U V/k_B T$ is an indicator of magnetization thermal stability. $K_U$ is the magnetic anisotropy energy of the magnetic microparticles, V is the volume of one magnetic microparticle, $k_B$ is the Boltzmann constant, and T is the absolute temperature. Making the magnetic microparticles smaller implies reducing their volume V. In turn, this makes $K_U V/k_B T$ smaller, thereby impairing thermal stability. An approach for addressing this problem is increasing $K_U$ commensurately, but doing so results in a larger coercitivity of the recording medium. In contrast, the strength of the write magnetic field afforded by the magnetic head is largely determined by the saturation flux density of the soft magnetic material that makes up the magnetic poles in the head. Thus, writing may become impossible when the coercitivity exceeds a tolerance that is determined on the basis of the limits of the strength of the write magnetic field.

Proposed methods for solving the problem of magnetization thermal stability include using a magnetic material having a large $K_U$, and so-called thermally assisted magnetic recording, in which writing is carried out by lowering coercitivity through heating of the recording medium immediately before application a write magnetic field. Thermally assisted magnetic recording can be broadly classified into magnetic dominant recording and optical dominant recording. In magnetic dominant recording, writing is governed by an electromagnetic coil element, and the radiation diameter of light is larger than the track width (recording width). In optical dominant recording, on the other hand, writing is governed by a light-radiating section, and the radiation diameter of light is approximately equal to the track width (recording width). That is, magnetic field determines the spatial resolution in magnetic dominant recording, whereas light determines the spatial resolution in optical dominant recording.

Japanese Patent Application Laid-open Nos. 2001-255254 and 2003-114184 disclose thermally-assisted magnetic heads in which an electroconductive plate-shaped plasmon antenna is disposed on a medium-facing surface, and in which near-field light is generated by irradiating light onto the plasmon antenna from an opposite side of the magnetic recording medium. The plasmon antenna is formed in such a manner that a corner at one end of the plasmon antenna is located close to a main magnetic pole. Near-field light is generated mainly around this corner. The stronger the intensity of near-field light that is generated at a corner that is located close to the main magnetic pole, the higher the temperature at which the recording medium can be heated. This is advantageous in terms of increasing the recording density of the hard disk drive.

When near-field light of strong enough intensity so as to carry out thermally assisted magnetic recording is generated at a corner on one end of the above conventional plasmon antennas, near-field light of some intensity is generated also at corners on other ends of the plasmon antenna. When the intensity of near-field light generated at corners on other ends is strong, that near-field light may heat up areas around the recording region of the recording medium, thereby giving rise to problems such as side-erasing. Meanwhile, when the intensity of the excitation light that is irradiated onto the plasmon antenna is weakened in order to weaken in turn the intensity of near-field light generated at corners on other ends, the intensity of near-field light generated at the corner on one end of the plasmon antenna becomes weaker as well, which makes it difficult to achieve high recording density. In order to achieve high recording density while suppressing problems such as side erasing, there must be reinforced the relative intensity of near-field light generated at a corner on one end of the plasmon antenna, namely the relative intensity of near-field light generated at a corner on one end with respect to the intensity of near-field light generated at corners on other ends. However, it has not been possible thus far to sufficiently increase the relative intensity of near-field light generated at a corner on one end of conventional plasmon antennas.

SUMMARY OF THE INVENTION

In the light of the above problems, it is an object of the present invention to provide a thermally assisted magnetic head, a head gimbal assembly and a hard disk drive, the thermally assisted magnetic head comprising a plasmon antenna that exhibits strong relative near-field light intensity generated in the vicinity of a first corner that is located close to a main magnetic pole, and to provide a method for manufacturing such a thermally assisted magnetic head.

The thermally assisted magnetic head according to the present invention comprises a medium-facing surface, a main magnetic pole provided on the medium-facing surface, and a plasmon antenna provided on the medium-facing surface, in the vicinity of the main magnetic pole, wherein the shape of the plasmon antenna, as viewed from a direction perpendicular to the medium-facing surface, is a triangle having first, second and third corners, the plasmon antenna being shaped as a flat plate the thickness direction of which is perpendicular to the medium-facing surface, and wherein the distance from the first corner to the main magnetic pole is shorter than the distance from the second corner to the main magnetic pole and the distance from the third corner to the main magnetic pole, and the second corner and the third corner are rounded.

As a result of diligent research, the inventors have found that the relative intensity of near-field light generated in the vicinity of the first corner, which is located closest to the main magnetic pole, becomes stronger, i.e. the relative intensity of near-field light generated in the vicinity of the first corner with respect to the intensity of near-field light generated in the vicinity of the second corner and the third corner becomes stronger when the second corner and the third corner of the plasmon antenna are rounded, as viewed from a direction perpendicular to the medium-facing surface. Accordingly, the thermally assisted magnetic head according to the present invention comprises a plasmon antenna that exhibits strong relative near-field light intensity generated in the vicinity of a first corner that is located close to a main magnetic pole.

Preferably, in particular, the radii of curvature of the second corner and the third corner range both from 10 nm to 30 nm. With such radii of curvature, the relative intensity of near-field light generated in the vicinity of the first corner, which is located close to the main magnetic pole, becomes particularly strong.

Preferably, moreover, an interior angle α of the first corner, an interior angle β of the second corner and an interior angle γ of the third corner satisfy the relationship α<β, α<γ and β≠γ. Near-field light of particularly strong intensity can be generated thereby in the vicinity of the first corner of the plasmon antenna, as compared with the case in which the plasmon antenna has a symmetrical shape (β=γ) as viewed from a direction perpendicular to the medium-facing surface.

Preferably, also, the plasmon antenna satisfies the relationship 20 degrees≦α≦55 degrees. The relative intensity of near-field light generated in the vicinity of the first corner becomes particularly strong thereby.

Preferably, the plasmon antenna comprises gold or silver.

The head gimbal assembly according to the present invention comprises the above-described thermally assisted magnetic head and a suspension onto which the thermally assisted magnetic head is mounted.

In the present invention, the head gimbal assembly comprises thus a thermally assisted magnetic head having a plasmon antenna that exhibits strong relative near-field light intensity generated in the vicinity of a first corner that is located close to a main magnetic pole.

The hard disk drive according to the present invention comprises the above-described head gimbal assembly and a magnetic recording medium facing the medium-facing surface.

In the present invention, the hard disk drive comprises thus a thermally assisted magnetic head having a plasmon antenna that exhibits strong relative near-field light intensity generated in the vicinity of a first corner that is located close to a main magnetic pole.

The method for manufacturing a thermally assisted magnetic head according to the present invention is a method for manufacturing a thermally assisted magnetic head having a plasmon antenna shaped as a triangular flat plate as viewed form a direction perpendicular to a medium-facing surface, the method comprising the steps of: forming a metal layer, which forms the plasmon antenna, on an insulating layer; forming a first mask layer on part of a stacking surface of the metal layer and etching a region of the stacking surface of the metal layer that is not masked by the first mask layer, to form thereby, in the metal layer, a first inclined surface extending from the stacking surface to the insulating layer; forming a second mask layer on the first inclined surface and the stacking surface of the metal layer, and etching the second mask layer, to remove the second mask layer from the stacking surface of the metal layer leaving the second mask layer remaining on the first inclined surface; and forming on the metal layer a second inclined surface extending from the first inclined surface to the insulating layer and defining, with the first inclined surface, an interior angle of a first corner of the plasmon antenna, by further etching the metal layer using as a mask the second mask layer remaining on the first inclined surface, wherein in the step of forming the first inclined surface, a rounded second corner of the plasmon antenna is formed between the first inclined surface and the stacking surface of the insulating layer, and in the step of forming the second inclined surface, a rounded third corner of the plasmon antenna is formed between the second inclined surface and the stacking surface of the insulating layer.

As a result of diligent research, the inventors have found that the relative intensity of near-field light generated in the vicinity of the first corner, which is located closest to the main magnetic pole, becomes stronger, i.e. the relative intensity of near-field light generated in the vicinity of the first corner with respect to the intensity of near-field light generated in the vicinity of the second corner and the third corner becomes stronger when the second corner and the third corner of the plasmon antenna are rounded. As a result, the present invention affords a thermally assisted magnetic head comprising a plasmon antenna that exhibits strong relative near-field light intensity generated in the vicinity of a first corner that is located close to a main magnetic pole.

In the step of forming the first inclined surface and in the step of forming the second inclined surface, the etching rate of the metal layer is preferably greater than the etching rate of the insulating layer. The radii of curvature of the second corner and the third corner can be easily controlled thereby.

The present invention provides thus a thermally assisted magnetic head, a head gimbal assembly and a hard disk drive, the thermally assisted magnetic head comprising a plasmon antenna that exhibits strong relative near-field light intensity generated in the vicinity of a first corner that is located close to a main magnetic pole, and provides a method for manufacturing such a thermally assisted magnetic head.

BRIEF DESCRIPTION OF THE DRAWINGS

FIG. 21 is a diagram illustrating shape conditions of plasmon antennas in examples and comparative examples;

FIG. 24 is a diagram illustrating shape conditions of plasmon antennas in examples and comparative examples;

FIG. 27 is a diagram illustrating shape conditions of plasmon antennas in examples and comparative examples;

FIG. 32 is a diagram illustrating shape conditions of plasmon antennas in examples and comparative examples;

FIG. 38 is a diagram illustrating shape conditions of plasmon antennas in examples and comparative examples;

FIG. 39 is a diagram illustrating shape conditions of plasmon antennas in examples and comparative examples;

FIG. 40 is a diagram illustrating shape conditions of plasmon antennas in examples and comparative examples;

FIG. 41 is a diagram illustrating shape conditions of plasmon antennas in examples and comparative examples.

DESCRIPTION OF THE PREFERRED EMBODIMENTS

Figure 1:
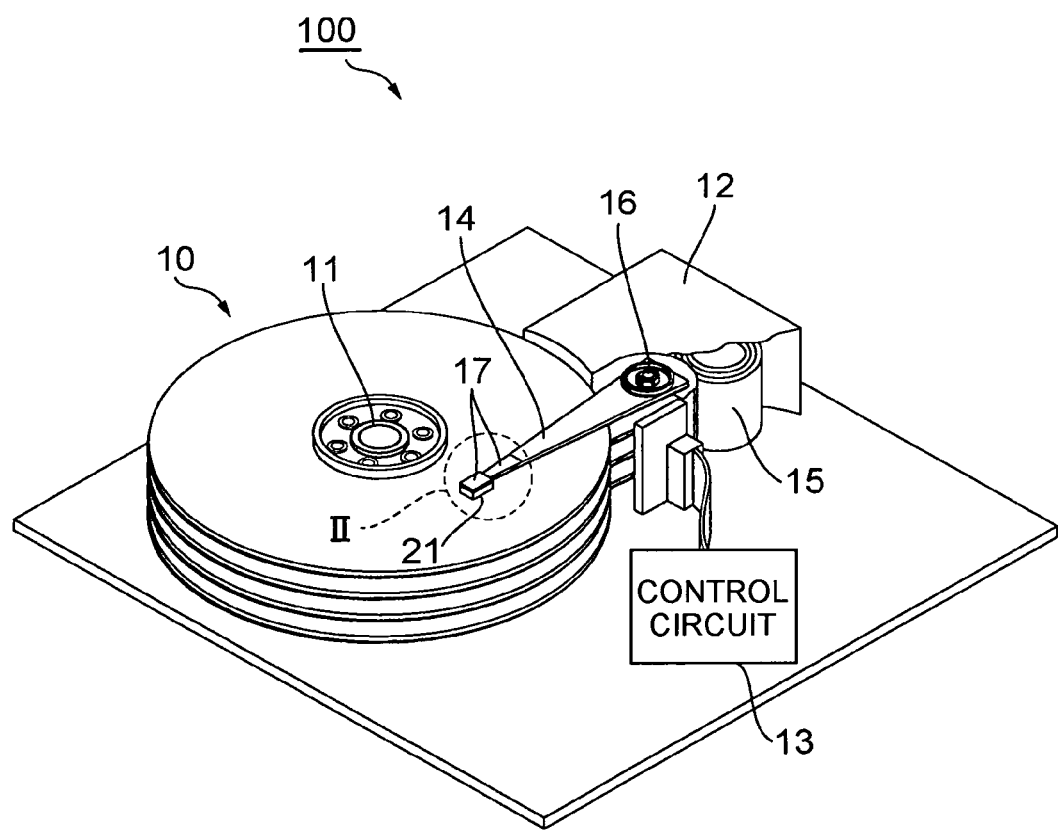
FIG. 1 is a perspective-view diagram of a hard disk drive according to an embodiment.

Embodiments of the thermally assisted magnetic head, the head gimbal assembly, the hard disk drive, and the method for manufacturing the thermally assisted magnetic head are explained in detail next with reference to accompanying drawings. Wherever possible, identical elements are denoted with identical reference numerals.

FIG. 1 is a perspective-view diagram of a hard disk drive according to an embodiment.

The hard disk drive 100 comprises magnetic disks 10, as a plurality of magnetic recording media that rotate around a rotation shaft of a spindle motor 11; an assembly carriage device 12 for positioning each thermally assisted magnetic head 21 on a track; and a recording, reproduction, and emission control circuit (control circuit) 13 for controlling writing and reading operations of the thermally assisted magnetic head 21, and for controlling a laser diode, as a light source that emits a laser beam, for performing thermally assisted magnetic recording, as described in detail below.

The assembly carriage device 12 is provided with a plurality of drive arms 14. These drive arms 14 are rockable around a pivot bearing shaft 16 by a voice coil motor (VCM) 15, and are stacked in the direction along this shaft 16. A head gimbal assembly (HGA) 17 is attached to the leading end of each drive arm 14. Each HGA 17 is provided with a thermally assisted magnetic head 21 in such a manner that the latter faces the surface of each magnetic disk 10. The surface of the magnetic head 21 facing the surface of the magnetic disk 10 is a medium-facing surface S (also called an air bearing surface (ABS)) of the thermally assisted magnetic head 21. The magnetic disks 10, drive arms 14, HGAs 17, and thermally assisted magnetic heads 21 may each be provided singly.

Figure 2:
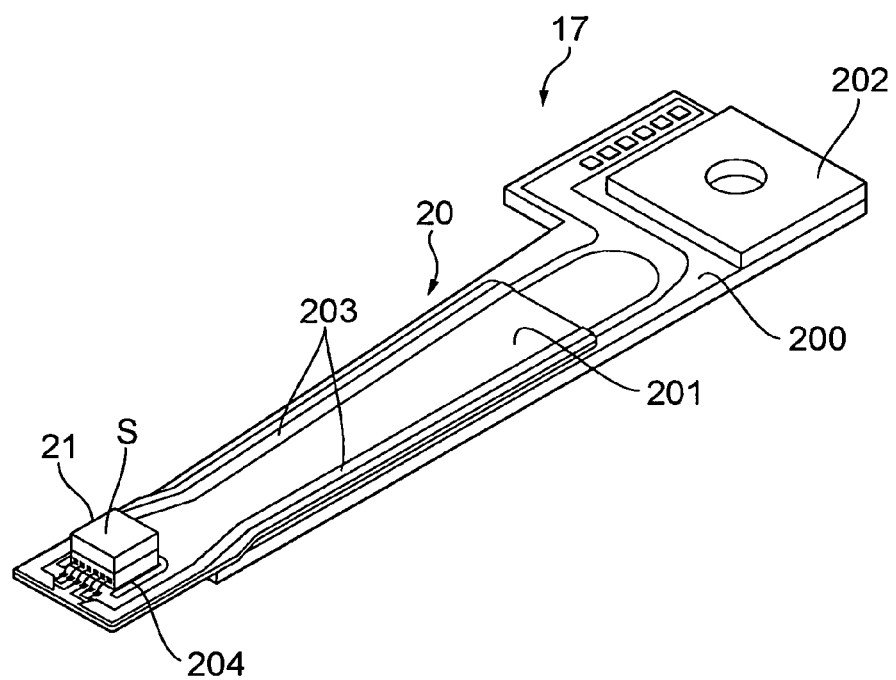
FIG. 2 is a perspective-view diagram of an HGA.

FIG. 2 is a perspective-view diagram of the HGA 17. In the figure, the medium-facing surface S of the HGA 17 is depicted facing upwards.

The HGA 17 is constructed by fixing the thermally assisted magnetic head 21 to a leading end of a suspension 20 and by electrically connecting one end of a wiring member 203 to terminal electrodes of the thermally assisted magnetic head 21. The suspension 20 comprises mainly a load beam 200, an elastic flexure 201 fixed and supported on the load beam 200, a tongue portion 204 formed in a plate spring shape at the tip of the flexure, a base plate 202 provided on the base of the load beam 200, and a wiring member 203 provided on the flexure 201 and comprising a lead conductor and connection pads electrically connected to the both ends of the lead conductor.

It is obvious that the structure of the suspension in the HGA 17 of the present invention is not limited to the above-described structure. Although not shown in the figure, an IC chip for head driving may be mounted midway in the suspension 20.

Figure 3:
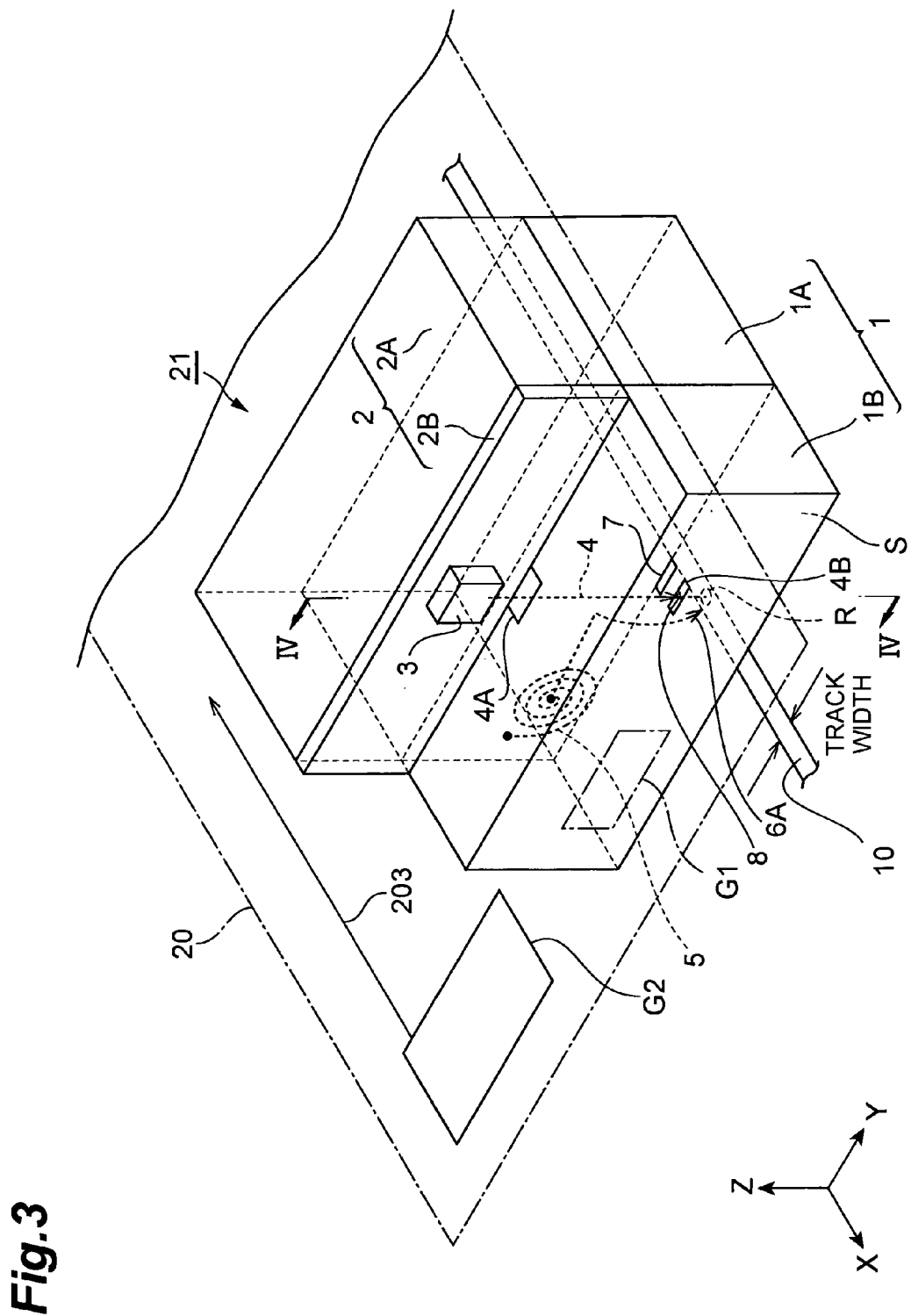
FIG. 3 is an enlarged perspective-view diagram of the vicinity of a thermally assisted magnetic head illustrated in FIG. 1.

FIG. 3 is an enlarged perspective-view diagram of the vicinity of the thermally assisted magnetic head 21 illustrated in FIG. 1.

The thermally assisted magnetic head 21 is mounted on the leading end of the suspension 20. The thermally assisted magnetic head 21 comprises a slider 1 and a light source unit 2 bonded together. The slider 1 comprises a magnetic head portion 1B formed on the YZ plane of a slider substrate 1A. The XY plane of the magnetic head portion 1B, in the −Z direction, constitutes the medium-facing surface S. The light source unit 2 comprises an insulating layer 2B on the YZ plane of a light source support substrate 2A. A light-emitting element 3 is fixed to the insulating layer 2B, on the YZ plane.

The magnetic head portion 1B comprises a plurality of elements embedded in an insulator. Each of these elements comprises a spiral coil 5 for generating a magnetic field for information writing when current is supplied to the coil; a main magnetic pole 6A extending from the center of the coil, for guiding the magnetic flux generated by the coil 5 up to the medium-facing surface S; a magnetoresistive effect element (MR element) 7 having a magnetoresponsive surface exposed at the medium-facing surface S; and a core 4 of a waveguide extending in the Z-axis direction, and surrounded with an insulator as a cladding.

The main magnetic pole 6A is exposed at the medium-facing surface S. However, the main magnetic pole 6A need not be exposed at the medium-facing surface S, provided that the main magnetic pole 6A is positioned in such a manner so as to be capable of applying a magnetic field towards a recording region R on the surface of the magnetic disk 10. An auxiliary magnetic pole may be provided, as the case may require, in the vicinity of the main magnetic pole 6A, in such a manner that magnetic field lines (magnetic flux) MF from the main magnetic pole 6A flow into the auxiliary magnetic pole via the recording region R (see FIG. 4).

The core 4 comprises a dielectric layer having a higher refractive index than the surrounding cladding, while the cladding comprises a dielectric layer having a lower refractive index than the core 4. The core 4 has a light incidence surface 4A onto which light from the light-emitting element 3 is incident, on the XY plane, in the positive direction of the Z-axis, and a light exit surface 4B on the XY plane, in the negative direction of the Z-axis, i.e. on the medium-facing surface S. In the present embodiment, the light-emitting element 3 is an edge-emitting laser diode. A laser beam emitted through the end face, which is parallel to the XY plane, enters into the core 4 via the light incidence surface 4A, and strikes the plasmon antenna 8 formed on light exit surface 4B. The light-emitting element 3 is thus provided in such a manner that the emission light thereof is incident on the plasmon antenna 8. As illustrated in FIG. 3, the plasmon antenna 8 has a triangular shape as viewed from the Z-axis direction, i.e. from the direction perpendicular to the medium-facing surface S. The plasmon antenna 8, moreover, forms a flat plate the thickness direction thereof is the Z-axis direction. The core 4 functions as a light guide for guiding the emission light of the light-emitting element 3 to the plasmon antenna 8.

The core 4 can be formed by stacking a plurality of dielectric layers having different refractive indices. Light propagating through the interior of the core 4 becomes thus refracted towards the layers having a higher average refractive index per unit thickness. When the core 4 comprises multiple dielectric layers, the thickness of the dielectric layers and the refractive indices thereof are set in such a manner that the light propagating through the interior of the core 4 comes near the plasmon antenna 8. That is, the average refractive index per unit thickness in the core 4 increases as the distance to the plasmon antenna 8 decreases.

The plasmon antenna 8 resonates with the incident beam and generates near-field light that heats up the recording region R. Information is written onto the recording region R as the magnetic field lines from the leading end of the main magnetic pole 6A enter the heated recording region R.

An electrode pad group G1, comprising a plurality of electrode pads, is formed on the YZ plane, in the negative direction of the X-axis, on the magnetic head portion 1B. The electrode pads are each connected to both ends of the coil 5 and to upper and lower electrodes of the MR element 7. The MR element 7 is obtained by stacking a ferromagnetic layer having a fixed magnetization direction, and a magnetization free layer where the magnetization direction is deflected in response to the surrounding magnetic field. Magnetoresistance varies in the MR element 7 in response to differences in the magnetization direction of the magnetization free layer and the ferromagnetic layer. Specifically, the magnetoresistance of the MR element 7 varies in response to the magnetic field generated around the recording region R, whereupon there varies also the current flowing between a pair of electrode pads in the electrode pad group G1. A hard magnet for magnetic domain control of the magnetization free layer is disposed at both ends, in the Y-axis direction, of the magnetization free layer.

During information writing, current is made to flow between another pair of electrode pads of the electrode pad group G1, such that the current flows between the ends of the coil 5. The magnetic recording elements are preferably perpendicular magnetic recording elements. The electrode pads in the electrode pad group G1 are electrically connected a second electrode pad group G2 formed on the suspension 20, and to the exterior, via the wiring member 203. The second electrode pad group G2 connected to the wiring member 203 comprises also a pair of electrode pads for supplying driving current to the light-emitting element 3. When driving current is caused to flow between these electrode pads, the light-emitting element 3 emits light and outputs a laser beam as excitation light.

The core 4, which may take on various shapes, extends linearly along the Z-axis in the present example. For the sake of a simpler explanation, the core 4 is denoted with the same reference numeral as the optical path of the beam LB (FIG. 4) emitted by the light-emitting element 3.

The slider substrate 1A and the light source support substrate 2A comprise, for instance, AlTiC ($Al_2O_3$—TiC). When substrates having high thermal conductivity are used as the slider substrate 1A and the light source support substrate 2A, these substrates have a heat-dissipating function. The XY plane of the light source support substrate 2A, in the positive direction of the Z-axis, is bonded to the rear face of the suspension 20.

The magnetic head portion 1B is formed by stacking the MR element 7, the cladding, the core 4, the coil 5 and the main magnetic pole 6A along the X-axis. The stacking direction runs along the array direction of the recording region R within a track, the track width being parallel to the Y-axis.

Figure 4:
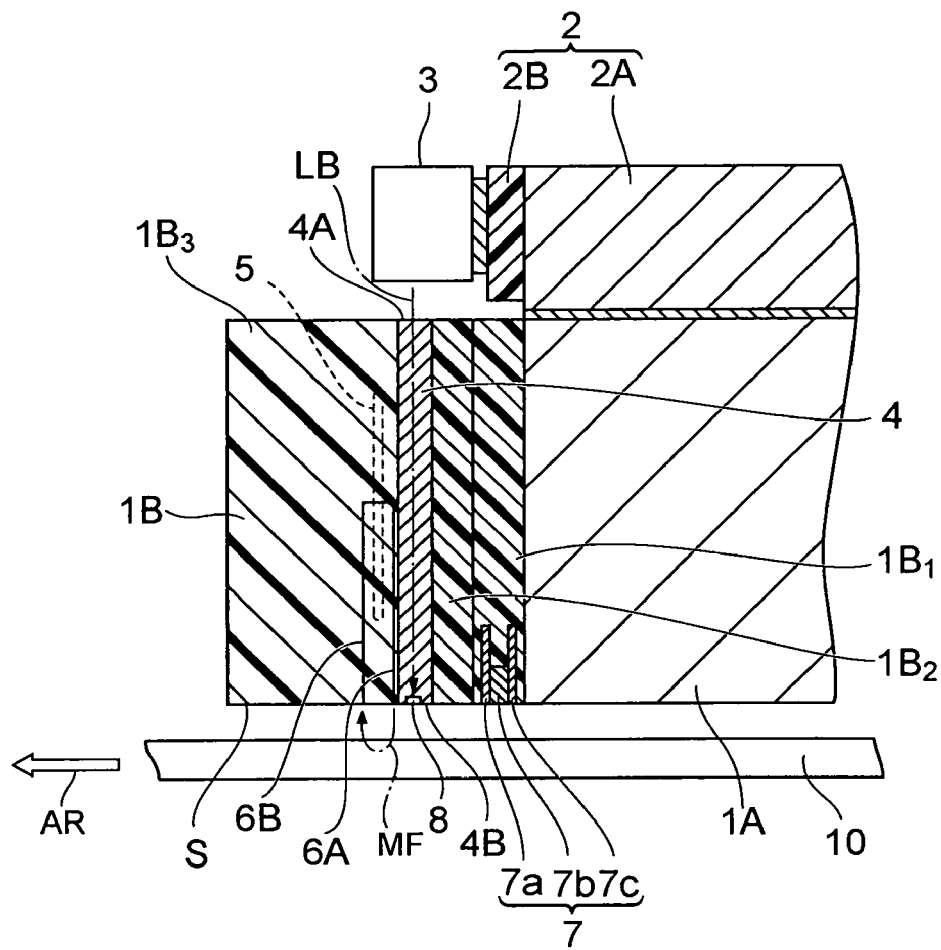
FIG. 4 is a cross-sectional diagram of the thermally assisted magnetic head illustrated in FIG. 3 along arrow IV-IV.

FIG. 4 is a cross-sectional diagram of the thermally assisted magnetic head illustrated in FIG. 3 along arrow IV-IV.

The light-emitting element 3 is bonded/fixed to the insulating layer 2B. An energy beam outputted by the light-emitting element 3 in the −Z direction enters into the core 4 through the light incidence surface 4A of the core 4, and strikes the plasmon antenna 8 provided on the light exit surface 4B of the core 4.

The leading end of the main magnetic pole 6A is positioned in the vicinity of the plasmon antenna 8. As a result, when the recording region R of the magnetic recording medium is heated by near-field light generated by the plasmon antenna 8, the recording magnetic field from the main magnetic pole 6A can be applied to the recording region R before the recording region R reverts to its original temperature. The main magnetic pole 6A is physically connected to a magnetic material layer, not shown, as a magnetic yoke. The magnetic material layer is further physically connected to a magnetic material layer 6B that makes up the auxiliary magnetic pole. An insulator layer 1B$_2$, as a cladding, surrounds the periphery of the core 4.

An overcoat layer 1B$_3$ comprising an insulating material is provided, as a cladding, on the core 4. A lower insulator layer 1B$_1$ is interposed between the insulator layer 1B$_2$ and the slider substrate 1A. The MR element 7 is embedded in the lower insulator layer 1B$_1$. The MR element 7 comprises an upper shield electrode 7a, a lower shield electrode 7c and a magnetoresistive effect layer 7b interposed between the upper shield electrode 7a and the lower shield electrode 7c. The magnetoresistive effect layer 7b is a multilayer film that elicits a magnetoresistive effect, for instance a tunnel magnetoresistive effect layer obtained by stacking a magnetization free layer and a ferromagnetic layer via a tunnel barrier layer, or a giant magnetoresistive effect layer obtained by stacking a magnetization free layer and a ferromagnetic layer via a non-magnetic metal layer.

The lower insulator layer 1B$_1$, the insulator layer 1B$_2$ and the overcoat 1B$_3$ of the present example comprise, for instance, low-refractive index $Al_2O_3$, while the core 4 comprises, for instance, a high-refractive index tantalum oxide ($TaO_X$). The material of the main magnetic pole 6A and the magnetic material layer 6B comprises, for instance, an alloy of two or three among Ni, Fe and Co, or an alloy having the foregoing as a main component and having added thereto a predetermined element.

Figure 5:
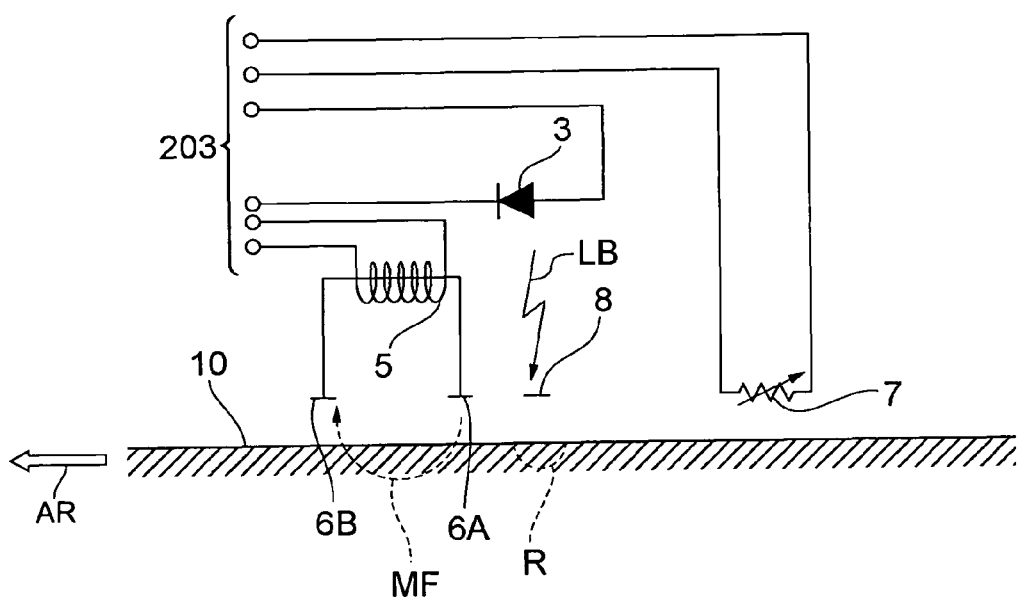
FIG. 5 is a diagram illustrating electric connections of a thermally assisted magnetic head.

FIG. 5 is a diagram illustrating electric connections of the thermally assisted magnetic head.

The light-emitting element 3, the coil 5 and both ends of the MR element 7 are connected to the wiring member 203. Conduction takes place in the light-emitting element 3 and the coil 5 via the wiring member 203. Also, the output from the MR element 7 is read via the wiring member 203.

When the light-emitting element 3 is energized, an excitation light beam LB strikes the plasmon antenna 8 and heats the recording region R of the magnetic disk 10 in the vicinity of the plasmon antenna 8. The magnetic disk 10 moves in the direction denoted by arrow AR in the figure, so that the leading end of the main magnetic pole 6A becomes positioned over the heated recording region R. When the coil 5 is then energized, the magnetic flux generated by the coil 5 reaches the leading end of the main magnetic pole 6A, whereupon magnetic field lines MF exiting through the leading end of the main magnetic pole 6A traverse the magnetic disk 10 and return to the magnetic material layer 6B, as a result of which information is written in the recording region R of the magnetic disk 10.

Thus, the thermally assisted magnetic head of the present embodiment further comprises the light-emitting element 3 for irradiating excitation light such as a laser beam. Sufficient near-field light can thus be generated by the plasmon antenna 8 through irradiation of the latter with an excitation light beam LB.

When the recording region R having information written thereon faces the MR element 7, the orientation of the magnetization of the magnetization free layer in the MR element 7 changes in response to the magnetic field from the recording region R, whereupon the magnetoresistance of the MR element 7 changes as well. Information written in the recording region R can be read as a result.

The plasmon antenna 8 of the present embodiment is explained in detail next.

Figure 6:
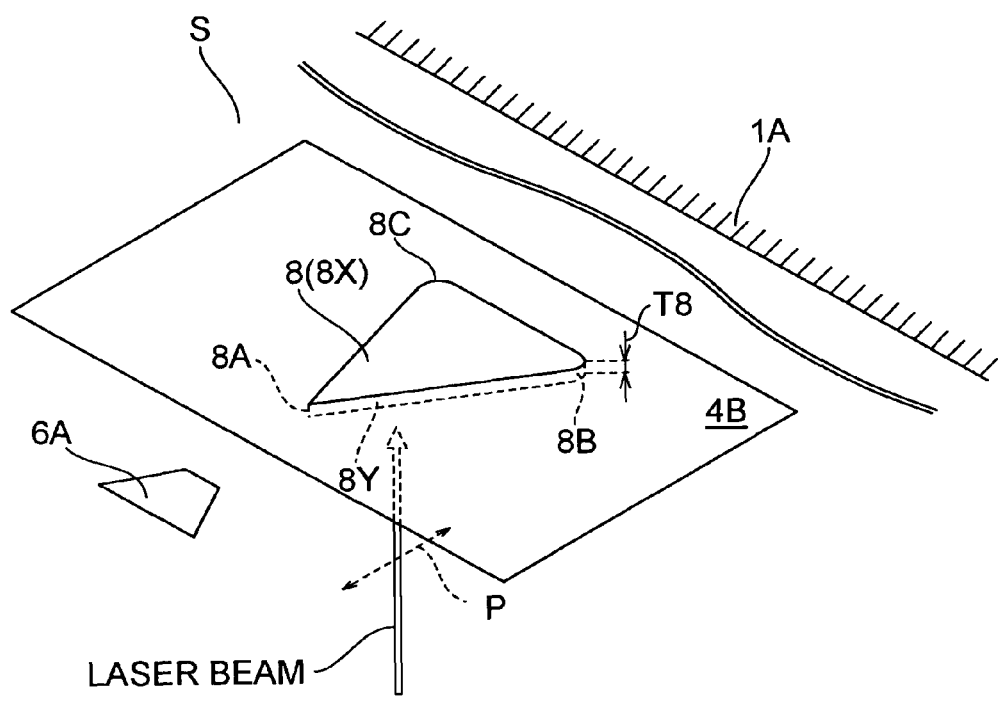
FIG. 6 is a perspective-view diagram of the vicinity of the medium-facing surface of the plasmon antenna.
Figure 7:
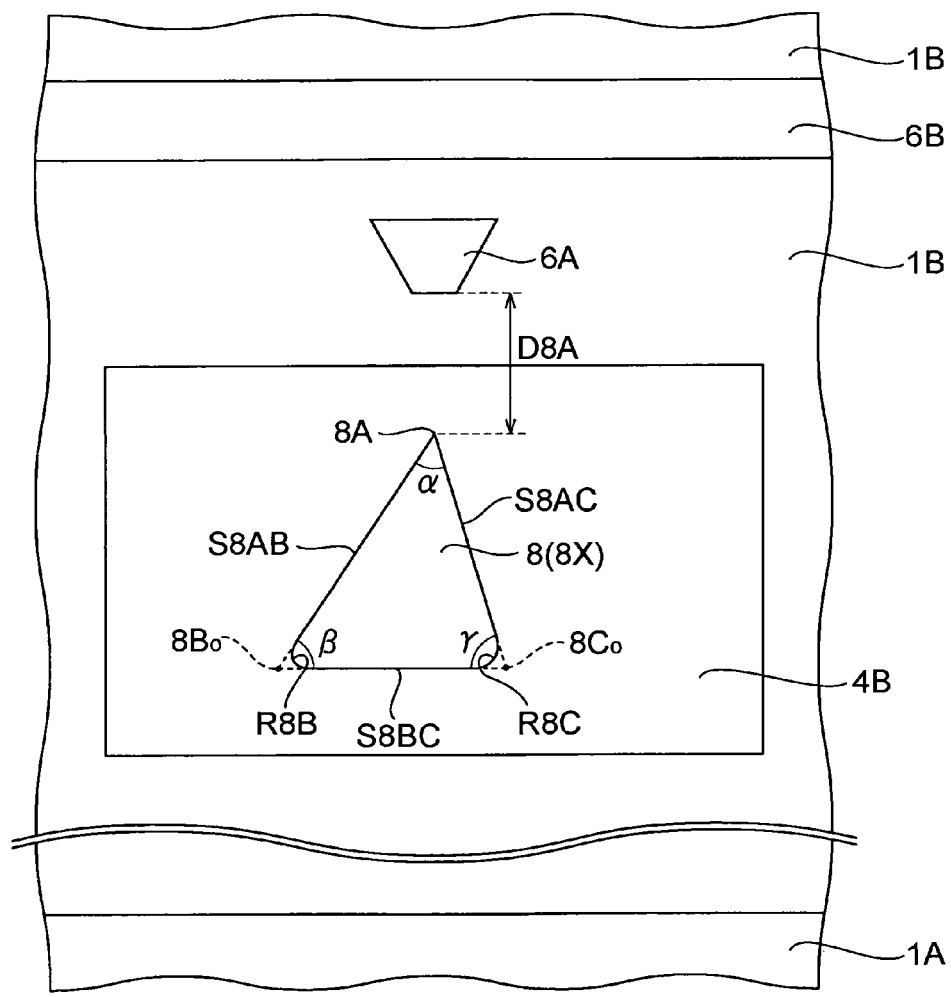
FIG. 7 is a plan-view diagram of the vicinity of the medium-facing surface of the plasmon antenna.
Figure 7:
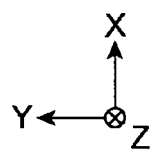

FIG. 6 is a perspective-view diagram of the vicinity of the medium-facing surface of the plasmon antenna, and FIG. 7 is a plan-view diagram of the vicinity of the medium-facing surface of the plasmon antenna.

As illustrated in FIGS. 6 and 7, the plasmon antenna 8 is provided on the light exit surface 4B. The plasmon antenna 8 is shaped as a triangular plate having a first corner 8A, a second corner 8B and a third corner 8C. More specifically, the plasmon antenna 8 is formed, on the XY plane of the medium-facing surface S, as a triangular flat plate the thickness of which extends in the Z-axis direction. Therefore, the plasmon antenna 8 has a front face 8X parallel to the medium-facing surface S, and side faces 8Y that define the thickness of the plasmon antenna 8 in the Z-axis direction.

As illustrated in FIGS. 6 and 7, the second corner 8B and the third corner 8C are rounded. By contrast, the first corner 8A is not rounded but forms a vertex. As illustrated in FIG. 7, the first corner 8A and the main magnetic pole 6A face each other across a short distance on the medium-facing surface S. The distance D8A from the first corner 8A to the main magnetic pole 6A is shorter than the distance from the second corner 8B to the main magnetic pole 6A and the distance from the third corner 8C to the main magnetic pole. The distance D8A is, for instance, 0.01 to 0.2 µm. The distance from the second corner 8B to the main magnetic pole 6A is the distance between the main magnetic pole 6A and the imaginary intersection point 8B$_0$ where prolongations of the side S8AB and the side S8BC, which define the second corner 8B, intersect each other; Likewise, the distance from the third corner 8C to the main magnetic pole 6A is the distance between the main magnetic pole 6A and the imaginary intersection point $8C_0$ where prolongations of the side S8AC and the side S8BC, which define the third corner 8C, intersect each other.

In the present invention, the interior angle α of the first corner 8A is smaller than the interior angle β of the second corner 8B and the interior angle γ of the third corner 8C (interior angle α<interior angle β, interior angle α<interior angle γ), as illustrated in FIG. 7. This makes it easier for the intensity of near-field light generated at the first corner 8A to be stronger than the intensity of near-field light generated at the second corner 8B and the third corner 8C when excitation light strikes the plasmon antenna 8. The interior angle α of the first corner 8A may be greater than the interior angle β of the second corner 8B and/or the interior angle γ of the third corner 8C.

As illustrated in FIG. 6, the thickness T8 of the plasmon antenna 8 is, for instance, 0.01 to 0.2 μm. The length of the side S8AB of the plasmon antenna 8, from the first corner 8A to the intersection point $8B_0$, is for instance 0.01 to 0.5 μm. The length of the side S8BC, from the intersection point $8B_0$ to the intersection point $8C_0$, is for instance 0.01 to 0.5 μm. The length of the side S8AC from the first corner 8A to the intersection point $8C_0$ is for instance 0.01 to 0.5 μm.

Materials that can be used as the material that makes up the plasmon antenna 8 include, for instance, metals such as gold (Au), silver (Ag), copper (Cu), iridium (Ir), magnesium (Mg), platinum (Pt), aluminum (Al) or palladium (Pd), or an alloy comprising at least one of such metals.

When the plasmon antenna 8 is irradiated with a laser beam, charges concentrate in the plasmon antenna 8, which emits thereupon near-field light towards the magnetic recording medium. This charge concentration is strongest in the vicinity of the first corner 8A, which has the smallest (sharpest) interior angle among the corners of the plasmon antenna 8. As a result, near-field light is irradiated mainly from the vicinity of the first corner 8A of the plasmon antenna 8. Near-field light is thus generated at the first corner 8A, which is located closest to the main magnetic pole 6A among the corners of the plasmon antenna 8. This allows shortening, as a result, the time that it takes for the magnetic field lines MF from the main magnetic pole 6A to reach the recording region R of the magnetic recording medium, after heating thereof. The thermally assisted magnetic head of the present embodiment is thus advantageous in terms of achieving higher recording density.

However, charge concentration occurs also in the vicinity of the second corner 8B and the third corner 8C during laser beam irradiation, and hence, near-field light of some intensity is also emitted from the vicinity of the second corner 8B and the third corner 8C. When the intensity of near-field light generated in the vicinity of the second corner 8B and the third corner 8C is strong, that near-field light may heat the region around the recording region R of the magnetic recording medium, which may give rise to problems such as side erasing. When the intensity of the excitation light that is irradiated onto the plasmon antenna 8 is weakened in order to weaken in turn the intensity of near-field light generated in the vicinity of the second corner 8B and the third corner 8C, the intensity of near-field light generated in the first corner 8A becomes weaker as well, which makes it difficult to achieve high recording density. In order to achieve high recording density while suppressing problems such as side erasing, there must be reinforced the relative intensity of near-field light generated at the first corner 8A in the plasmon antenna 8, namely the relative intensity of near-field light generated at the first corner 8A with respect to the intensity of near-field light generated at the second corner 8B and the third corner 8C.

In the light of the above, the inventors have found, as a result diligent research, that the relative intensity of near-field light generated in the vicinity of the first corner 8A, which is located closest to the main magnetic pole, is stronger when the second corner 8B and the third corner 8C of the plasmon antenna 8 are rounded, as viewed from a direction perpendicular to the medium-facing surface S, than when the second corner 8B and the third corner 8C are not rounded. Therefore, the thermally assisted magnetic head 21 of the present embodiment allows generating near-field light of strong enough relative intensity in the vicinity of the first corner 8A that is located close to the main magnetic pole 6A. As a result, the thermally assisted magnetic head 21 according to the present embodiment allows achieving high recording density while suppressing problems such as side erasing.

As illustrated in FIG. 7, the radius of curvature R8B of the second corner 8C and the radius of curvature R8C of the third corner 8C of the plasmon antenna 8 range preferably from 10 nm to 30 nm, as described in detail below. With such radii of curvature, the relative intensity of near-field light generated in the vicinity of the first corner 8A, which is located close to the main magnetic pole 6A, becomes particularly strong.

Moreover, in addition to the interior angle α of the first corner 8A being smaller than the interior angle β of the second corner 8B and the interior angle γ of the third corner 8C (interior angle α<interior angle β, interior angle α<interior angle γ), the dimensions of the interior angle β and the interior angle γ are preferably different (interior angle β≠interior angle γ), as illustrated in FIG. 7 (see details below). In that case, the relative intensity of near-field light generated in the vicinity of the first corner 8A of the plasmon antenna 8 becomes yet stronger as compared with the case in which the plasmon antenna has a symmetrical shape (β=γ) as viewed from a direction perpendicular to the medium-facing surface S. The interior angle α of the first corner 8A refers to the inner angle of the triangle of the plasmon antenna 8, among the angles formed by the two sides (side S8AB and side S8AC) that define the first corner 8A, as viewed from a direction perpendicular to the medium-facing surface S; the interior angle β of the second corner 8B refers to the inner angle of the triangle of the plasmon antenna 8, among the angles formed by the two sides (side S8AB and side S8BC) that define the second corner 8B; and the interior angle γ of the third corner 8C refers to the inner angle of the triangle of the plasmon antenna 8, among the angles formed by the two sides (side S8AC and side S8BC) that define the third corner 8C, as viewed from a direction perpendicular to the medium-facing surface.

As described in detail below, the plasmon antenna 8 satisfies preferably the relationship 20 degrees≦α≦55 degrees, in which case the relative intensity of near-field light generated in the vicinity of the first corner 8A becomes particularly strong.

Preferably, the polarization direction P of the laser beam irradiated onto the plasmon antenna 8 has a component in the X-axis direction, which is the direction in which the first corner 8A and the main magnetic pole 6A oppose each other. More preferably, the polarization direction P coincides with the X-axis direction, as illustrated in FIG. 6, since in that case the intensity of near-field light generated in the vicinity of the first corner 8A becomes stronger.

The plasmon antenna 8 may have a shape such that the values of the interior angle β and the interior angle γ in the above embodiment are swapped.

A method for manufacturing the thermally assisted magnetic head according to the present embodiment is explained next with reference to FIGS. 8A through 19B.

FIG. 8A, FIG. 9A, FIG. 10A, FIG. 11A, FIG. 12A, FIG. 13A, FIG. 14A, FIG. 15A, FIG. 16A, FIG. 17A, FIG. 18A and FIG. 19A are plan-view diagrams of intermediates of a thermally assisted magnetic head, viewed from the X-axis direction, which is a stacking direction, for explaining a manufacturing method of a thermally assisted magnetic head. FIG. 8B, FIG. 9B, FIG. 10B, FIG. 11B, FIG. 12B, FIG. 13B, FIG. 14B, FIG. 15B, FIG. 16B, FIG. 17B, FIG. 18B and FIG. 19B are cross-sectional diagrams, along a predefined line, of the intermediates of the thermally assisted magnetic head of FIG. 8A, FIG. 9A, FIG. 10A, FIG. 11A, FIG. 12A, FIG. 13A, FIG. 14A, FIG. 15A, FIG. 16A, FIG. 17A, FIG. 18A and FIG. 19A, respectively.

In the method for manufacturing the thermally assisted magnetic head, firstly there are formed, using known methods, the lower insulating layer $1B_1$ and the MR element 7 on the YZ plane of the slider substrate 1A, in such a manner that the MR element 7 is embedded in the lower insulating layer $1B_1$, followed by formation of the insulating layer $1B_2$, comprising for instance $Al_2O_3$, on the lower insulating layer $1B_1$ (FIG. 4).

Figure 8A:
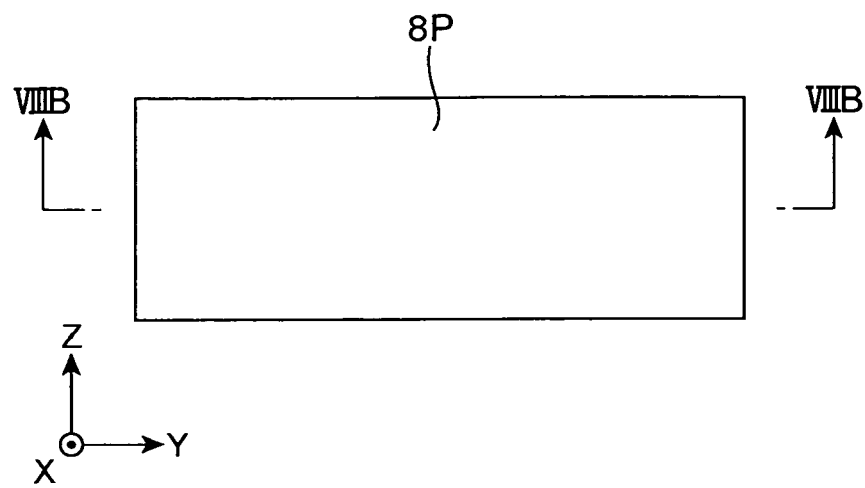
FIG. 8A is a plan-view diagram of an intermediate of the thermally assisted magnetic head, for explaining a manufacturing method thereof.
Figure 8B:
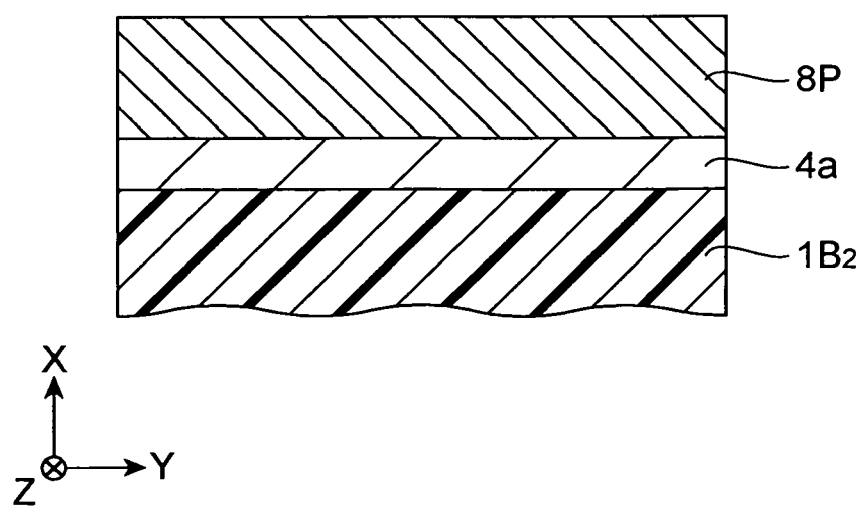
FIG. 8B is a cross-sectional diagram of an intermediate of the thermally assisted magnetic head, for explaining a manufacturing method thereof.

As illustrated in FIGS. 8A and 8B, the insulating layer 4a and a metal layer 8P that will be the plasmon antenna 8 are formed, for instance by sputtering, on the insulator layer $1B_2$. The insulating layer 4a, which is a layer that will be a part of the core 4, comprises an insulating layer, for instance of tantalum oxide ($TaO_x$), having a higher refractive index than the lower insulator layer $1B_1$. The thickness of the insulating layer 4a is, for instance, 0 to 2 μm. The insulating layer 4a may be left out. When the insulating layer 4a is not provided, the metal layer 8P is formed directly on the insulator layer $1B_2$. The metal layer 8P comprises a material of the portion that will be later the plasmon antenna, for instance a metal such as gold (Au), silver (Ag), copper (Cu), iridium (Ir), magnesium (Mg), platinum (Pt), aluminum (Al) or palladium (Pd). The thickness of the metal layer 8P is, for instance, 50 to 300 nm.

Figure 9A:
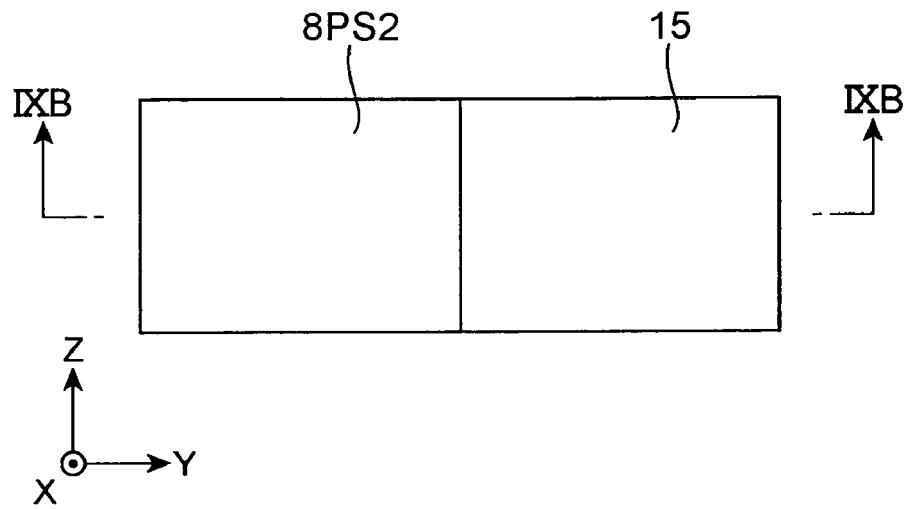
FIG. 9A is a plan-view diagram of an intermediate of the thermally assisted magnetic head, for explaining a manufacturing method thereof.
Figure 9B:
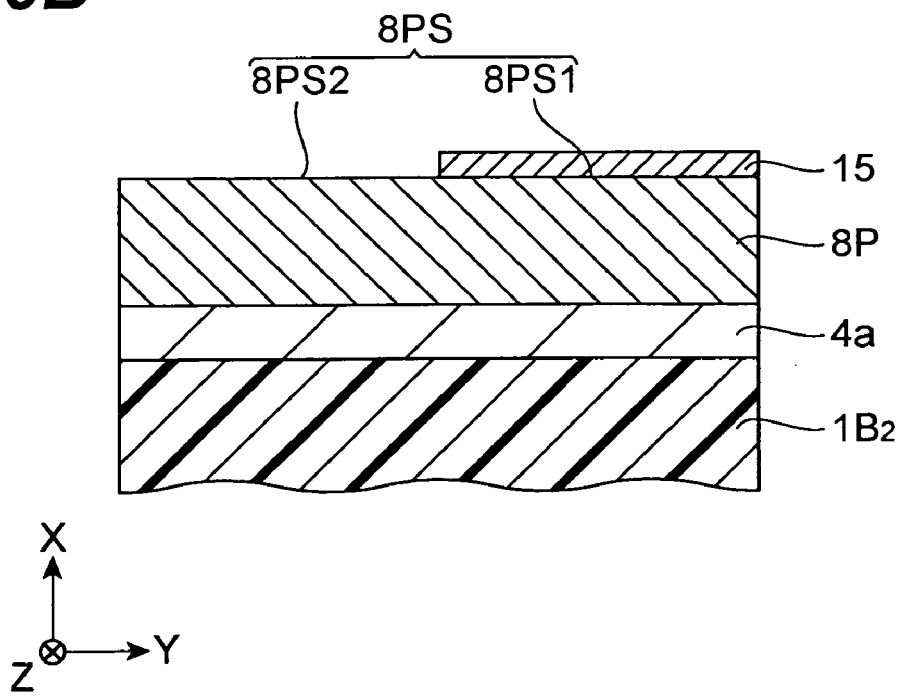
FIG. 9B is a cross-sectional diagram of an intermediate of the thermally assisted magnetic head, for explaining a manufacturing method thereof.

Next, a pair of first mask layers 15 is formed, for instance by sputtering, on part of a stacking surface 8PS of the metal layer 8P, as illustrated in FIGS. 9A and 9B. The thickness of the first mask layer 15 is, for instance, 8 to 50 nm. The first mask layer 15 comprises a metal such as Ta or NiFe. Through formation of the first mask layer 15 there form a region 8PS1, masked by the first mask layer 15, and a region 8PS2, not masked by the first mask layer 15, on the stacking surface 8PS of the metal layer 8P.

Figure 10A:
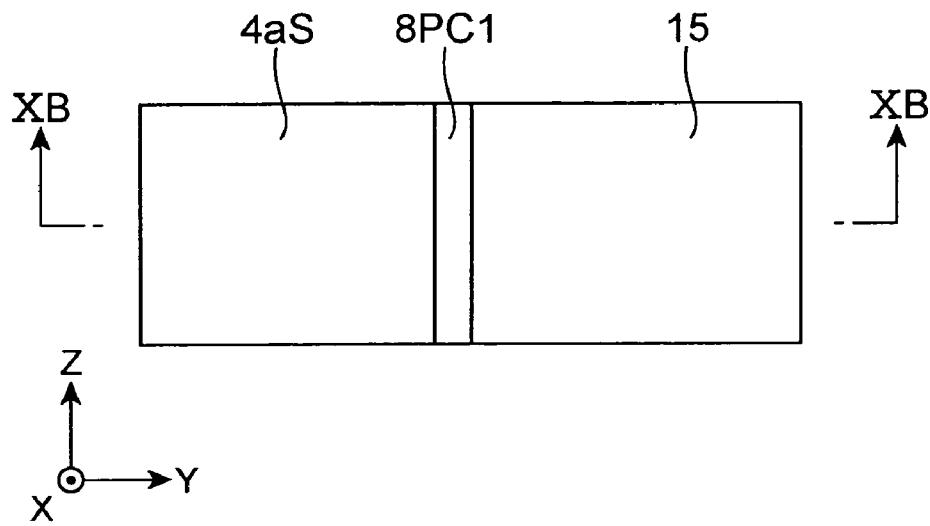
FIG. 10A is a plan-view diagram of an intermediate of the thermally assisted magnetic head, for explaining a manufacturing method thereof.
Figure 10B:
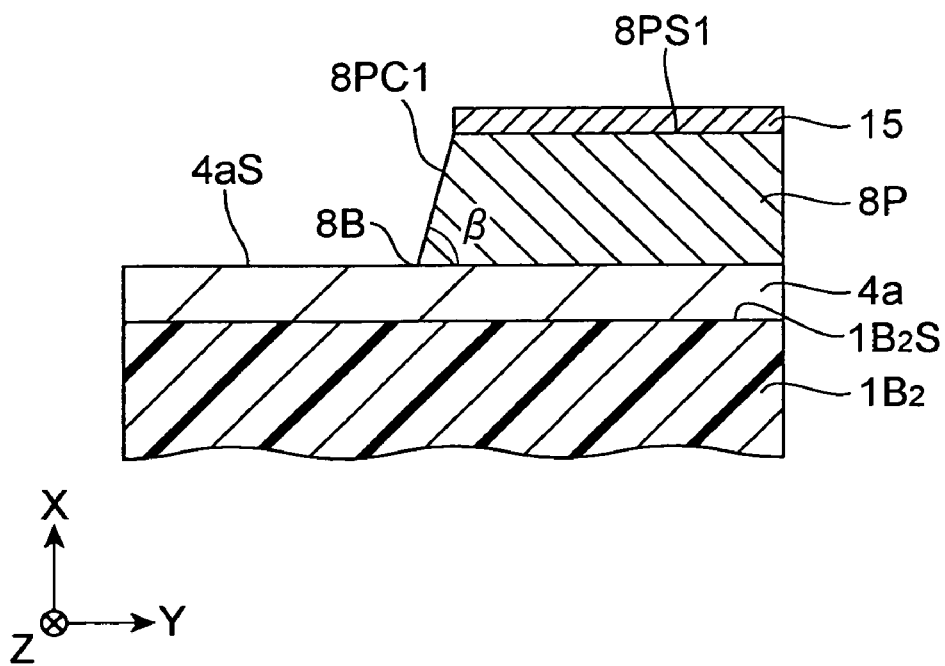
FIG. 10B is a cross-sectional diagram of an intermediate of the thermally assisted magnetic head, for explaining a manufacturing method thereof.

The non-masked region 8PS2 of the metal layer 8P is then etched by dry etching, for instance by ion milling using argon ions. The metal layer 8P is etched thereupon in such a manner that the cross section thereof slants away from the first mask layer 15, on account of the shadow effect of the first mask layer 15, to expose thereby a portion of a stacking surface 4aS of the insulating layer 4a, as illustrated in FIGS. 10A and 10B. In the metal layer 8P there forms, as a result, a first inclined surface 8PC1 extending from the region 8PS1 to the insulating layer 4a. The interior angle β of a corner B defined by the stacking surface 4aS of the insulating layer 4a and the first inclined surface 8PC1 (that is, a corner B between the stacking surface 4aS of the insulating layer 4a and the first inclined surface 8PC1), is controlled by adjusting the thickness of the first mask layer 15 and the dry etching conditions, for instance the bombardment angle of argon ions during etching of the metal layer 8P by ion milling (incidence angle of argon ions onto the stacking surface 8PS of the metal layer 8P). The corner B and the interior angle β yield thereafter the second corner 8B and the interior angle β of the plasmon antenna 8, as viewed from a direction perpendicular to the medium-facing surface (FIG. 7). When the insulating layer 4a is not provided, the first inclined surface 8PC1 extends from the region 8PS1 to the stacking surface $1B_2S$ of the insulator layer $1B_2$, such that the second corner 8B and the interior angle β are defined by the first inclined surface 8PC1 and the stacking surface $1B_2S$ of the insulator layer $1B_2$.

Figure 11A:
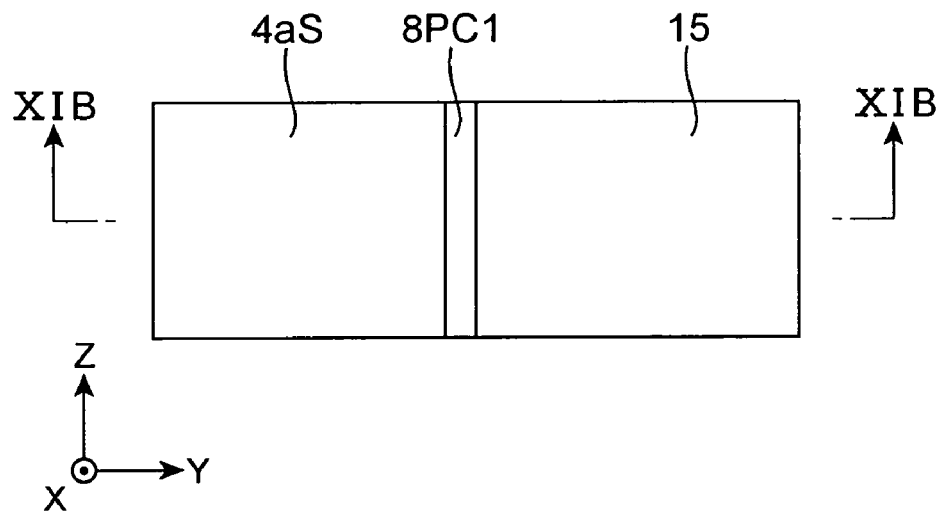
FIG. 11A is a plan-view diagram of an intermediate of the thermally assisted magnetic head, for explaining a manufacturing method thereof.
Figure 11B:
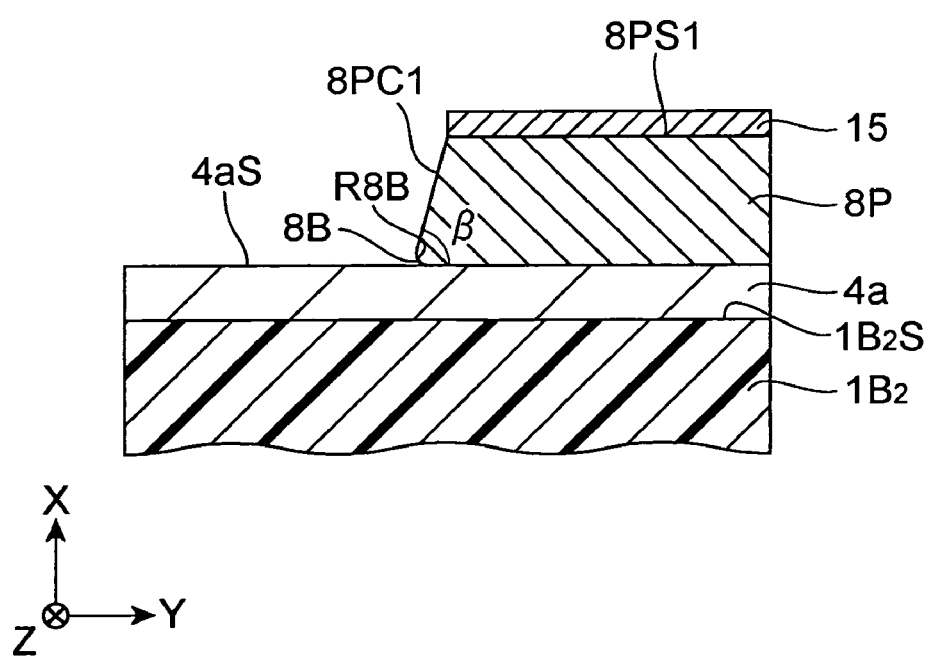
FIG. 11B is a cross-sectional diagram of an intermediate of the thermally assisted magnetic head, for explaining a manufacturing method thereof.

The second corner 8B is rounded next, as illustrated in FIGS. 11A and 11B, through further etching of the metal layer 8P, for instance by dry etching such as ion milling using argon ions, employing the first mask layer 15 as a mask. The radius of curvature R8B of the second corner 8B ranges preferably from 10 nm to 30 nm. The dimension of the radius of curvature R8B is controlled by adjusting the thickness of the first mask layer 15 and the dry etching conditions, for instance the bombardment angle of argon ions during etching of the metal layer 8P by ion milling (incidence angle of argon ions onto the stacking surface 8PS of the metal layer 8P).

The etching rate of the metal layer 8P during rounding of the second corner 8B through further etching of the metal layer 8P using the first mask layer 15 as a mask, as described above, is preferably greater than the etching rate of the insulating layer 4a (the insulator layer $1B_2$, when the insulating layer 4a is not provided). That way, the insulating layer 4a (or the insulator layer $1B_2$) can function as an etching stop layer during rounding of the second corner 8B through etching of the metal layer 8P. The radius of curvature R8B of the second corner 8B can be controlled easily thereby. In particular, the etching rate selectivity of the metal layer 8P relative to the insulating layer 4a (value obtained by dividing the value of the etching rate of the metal layer 8P by the value of the etching rate of the insulating layer 4a (or the insulator layer $1B_2$)) is preferably 18 or greater, since in that case the radius of curvature R8B of the second corner 8B can be controlled particularly easily.

Figure 12A:
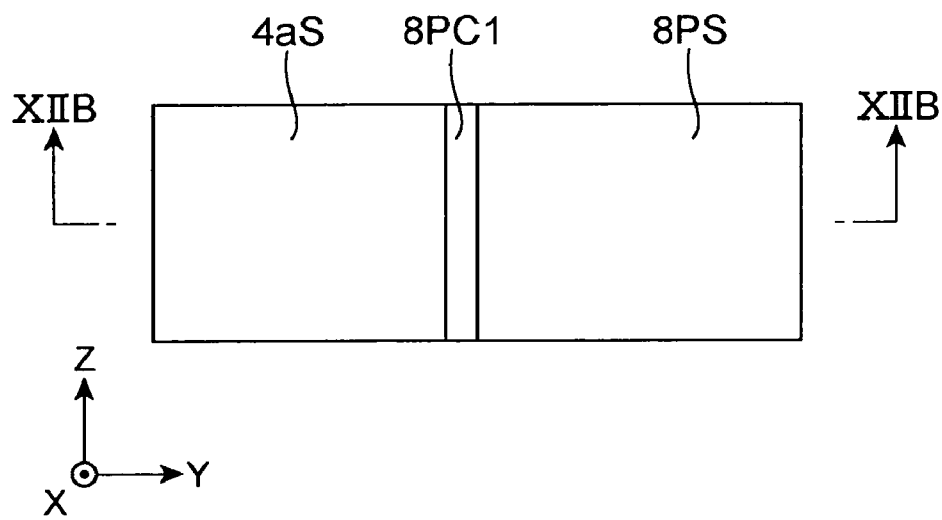
FIG. 12A is a plan-view diagram of an intermediate of the thermally assisted magnetic head, for explaining a manufacturing method thereof.
Figure 12B:
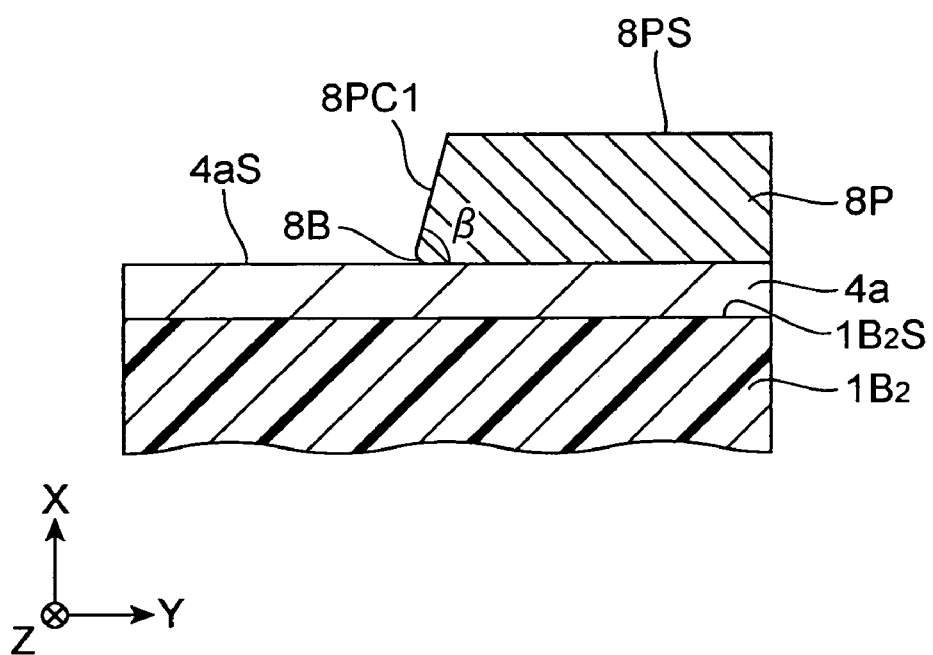
FIG. 12B is a cross-sectional diagram of an intermediate of the thermally assisted magnetic head, for explaining a manufacturing method thereof.

The first mask layer 15 on the region 8PS1 is removed then by reactive ion etching (RIE), for instance using $CF_4$ as an etching gas. The first inclined surface 8PC1 and the stacking surface 8PS of the metal layer 8P become exposed as a result, as illustrated in FIGS. 12A and 12B.

Figure 13A:
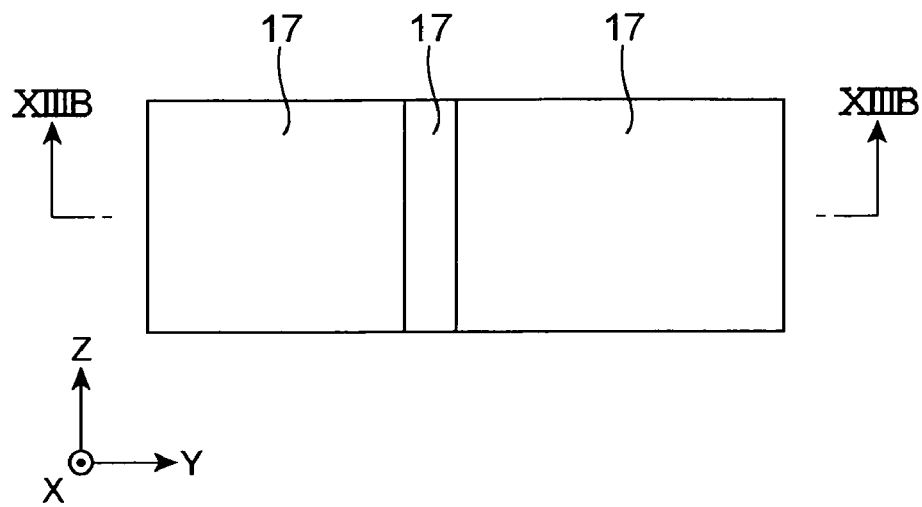
FIG. 13A is a plan-view diagram of an intermediate of the thermally assisted magnetic head, for explaining a manufacturing method thereof.
Figure 13B:
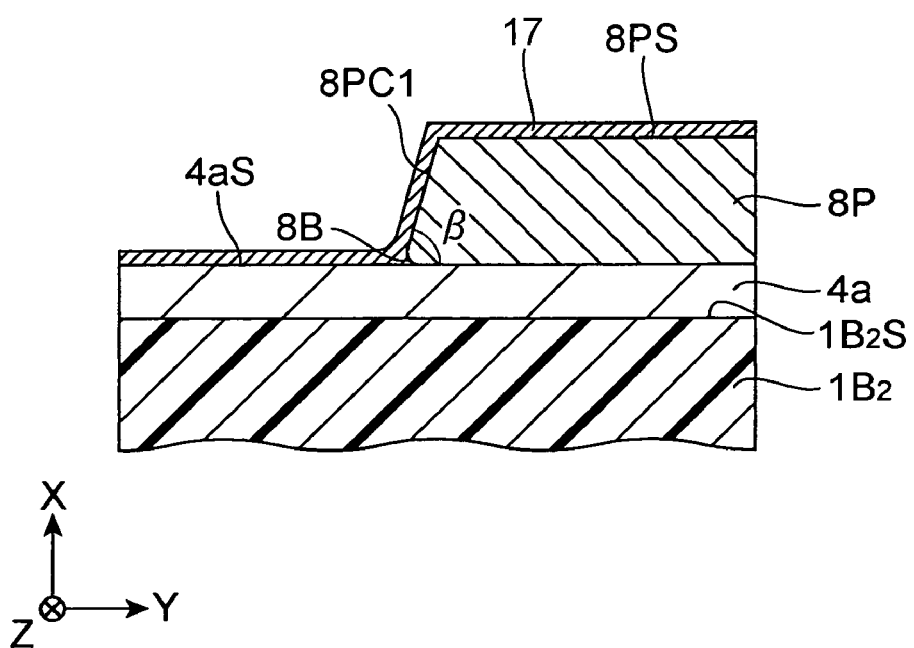
FIG. 13B is a cross-sectional diagram of an intermediate of the thermally assisted magnetic head, for explaining a manufacturing method thereof.

A second mask layer 17 is formed next, for instance by sputtering, on the metal layer 8P and the exposed insulating layer 4a, as illustrated in FIGS. 13A and 13B. The second mask layer 17 is formed thereby on the first inclined surface 8PC1 and the stacking surface 8PS of the metal layer 8P. The thickness of the second mask layer 17 is, for instance, 12 to 75 nm. The second mask layer 17 can have a two-layer structure comprising a metal layer and an oxide layer that are layered in this order from the metal layer 8P and the insulating layer 4a. The metal layer and the oxide layer of the second mask layer 17 can be, for instance, a Ta layer and a $TaO_x$ layer. The second mask layer 17 may be made of a metal layer alone, comprising Ta, NiFe or the like.

Figure 14A:
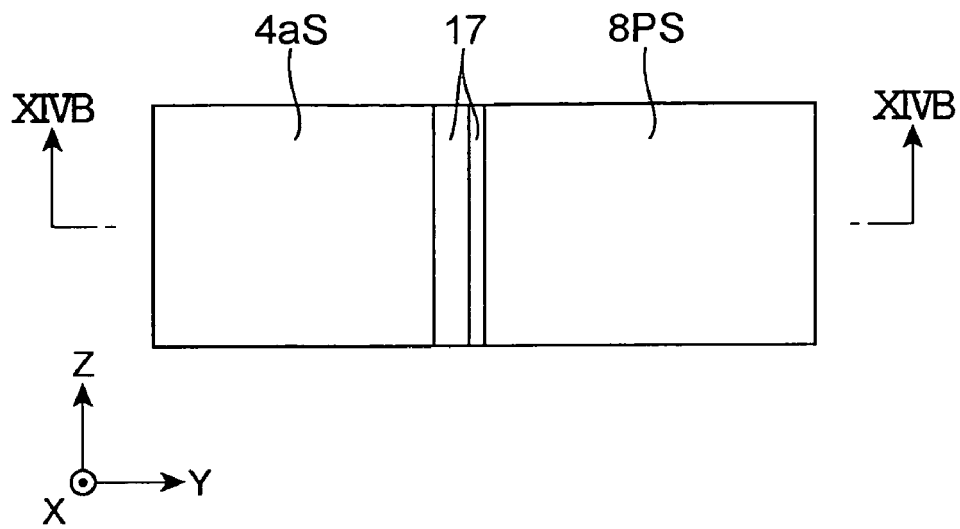
FIG. 14A is a plan-view diagram of an intermediate of the thermally assisted magnetic head, for explaining a manufacturing method thereof.
Figure 14B:
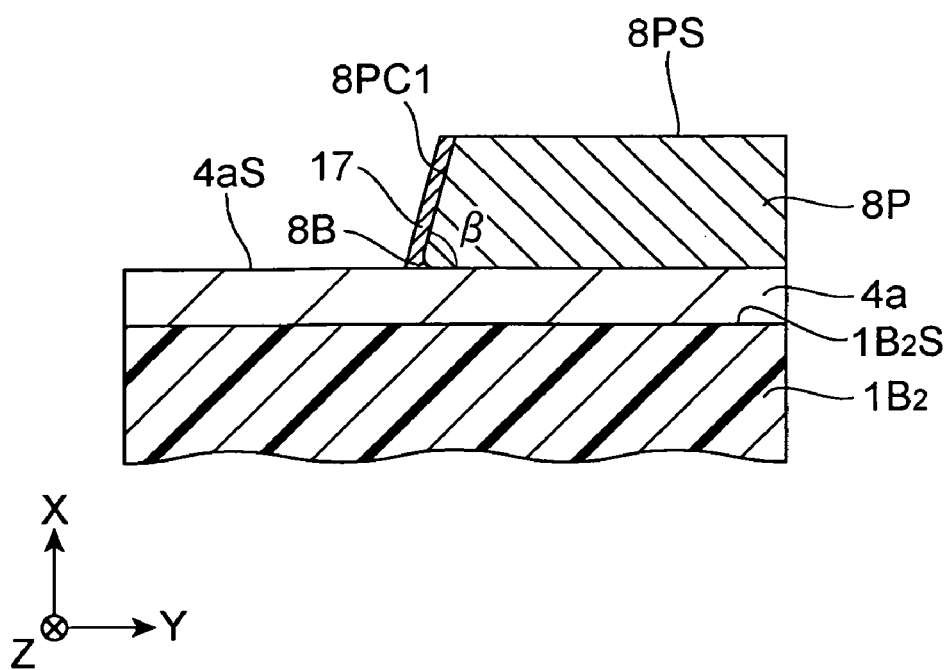
FIG. 14B is a cross-sectional diagram of an intermediate of the thermally assisted magnetic head, for explaining a manufacturing method thereof.

Next, the second mask layer 17 is removed from the stacking surface 8PS of the metal layer 8P, but remaining on the first inclined surface 8PC1, as illustrated in FIGS. 14A and 14B, through etching of the second mask layer 17, for instance by dry etching such as ion milling using argon ions. The etching rate of the second mask layer 17 on the stacking surface 8PS and the stacking surface 4aS can be made different from the etching rate of the second mask layer 17 on the first inclined surface 8PC1 by appropriately adjusting conditions during dry etching, for instance by adjusting the bombardment angle of argon ions during etching of the second mask layer 17 by ion milling (incidence angle of argon ions onto the stacking surface 8PS of the metal layer 8P). As a result, the second mask layer 17 can be removed from the stacking surface 8PS of the metal layer 8P while remaining on the first inclined surface 8PC1, as described above. The incidence angle of argon ions onto the stacking surface 8PS of the metal layer 8P during etching of the second mask layer 17 by ion milling ranges, for instance, from 30 to 60 degrees.

Preferably, the slider substrate 1A (FIG. 4) on which the metal layer 8P and so forth are formed is rotated, around an axis of rotation that runs along the X-axis, during etching of the second mask layer 17 by dry etching. Doing so allows achieving a desired ion incidence angle and desired incidence duration, on the basis of which the amount of etching can be controlled accurately.

Figure 15A:
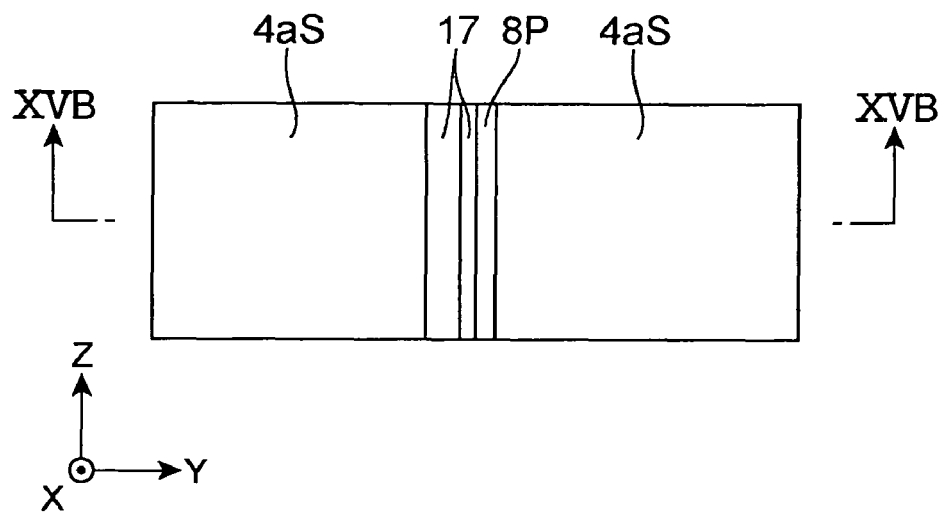
FIG. 15A is a plan-view diagram of an intermediate of the thermally assisted magnetic head, for explaining a manufacturing method thereof.
Figure 15B:
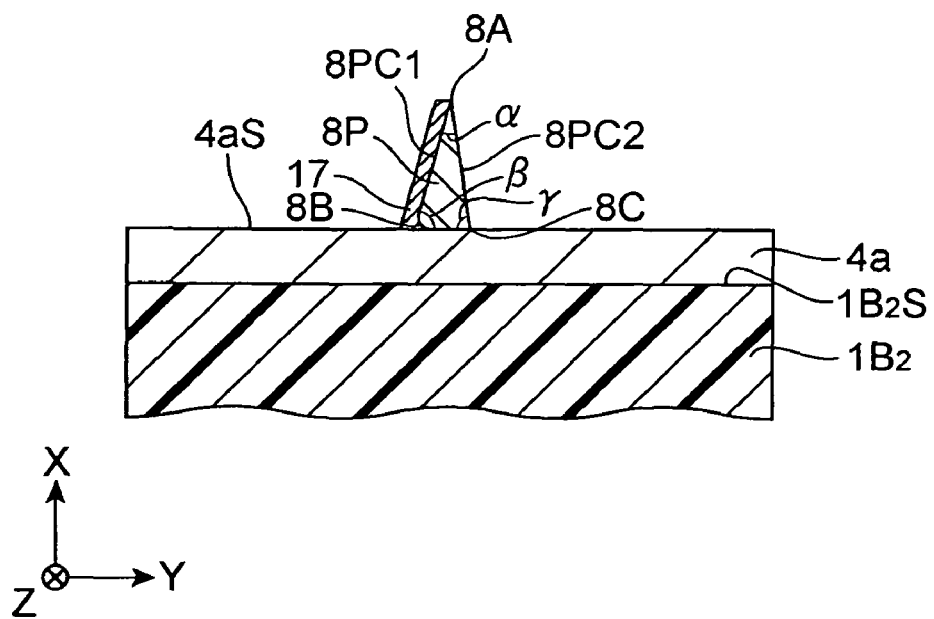
FIG. 15B is a cross-sectional diagram of an intermediate of the thermally assisted magnetic head, for explaining a manufacturing method thereof.

The metal layer 8P is etched next by dry etching, for instance by ion milling with argon ions, using as a mask the second mask layer 17 remaining on the first inclined surface 8PC1, as illustrated in FIGS. 15A and 15B. As a result, a second inclined surface 8PC2 extending from the first inclined surface 8PC1 to the insulating layer 4a is formed on the metal layer 8P. The above is achieved by appropriately deciding the combination of materials that make up the metal layer 8P and the second mask layer 17, and appropriately setting various conditions during dry etching of the metal layer 8P, in such a manner so as to ensure an appropriate ratio between the etching rates of the materials that form the metal layer 8P and the second mask layer 17. The first corner 8A is defined by the first inclined surface 8PC1 and the second inclined surface 8PC2. The third corner 8C is defined by the second inclined surface 8PC2 and the stacking surface 4aS of the insulating layer 4a. That is, the third corner 8C is positioned between the second inclined surface 8PC2 and the stacking surface 4aS of the insulating layer 4a. The dimension of the interior angle α of the first corner 8A and the interior angle γ of the third corner 8C are controlled by adjusting the dry etching conditions, for instance the bombardment angle of argon ions during etching of the metal layer 8P by ion milling (incidence angle of argon ions onto the stacking surface 8PS of the metal layer 8P). The interior angle α of the first corner 8A yields thereafter the interior angle α of the first corner 8A in the plasmon antenna 8, while the interior angle γ of the third corner 8C yields thereafter the interior angle γ of the third corner 8C of the plasmon antenna 8, as viewed from a direction perpendicular to the medium-facing surface (FIG. 7).

Preferably, the slider substrate 1A (FIG. 4) on which the metal layer 8P and so forth are formed is rotated, around an axis of rotation that runs along the X-axis, during etching of the metal layer 8P. Doing so allows achieving a desired ion incidence angle and desired incidence duration, on the basis of which the amount of etching can be controlled accurately. The metal layer 8P, to be the plasmon antenna 8, is thus fabricated into a pair of triangular prisms, as viewed from a direction perpendicular to the medium-facing surface S, i.e. the Z-axis direction. When the insulating layer 4a is not provided, the interior angle γ is defined by the second inclined surface 8PC2 and the stacking surface $1B_2S$ of the insulator layer $1B_2$.

Figure 16A:
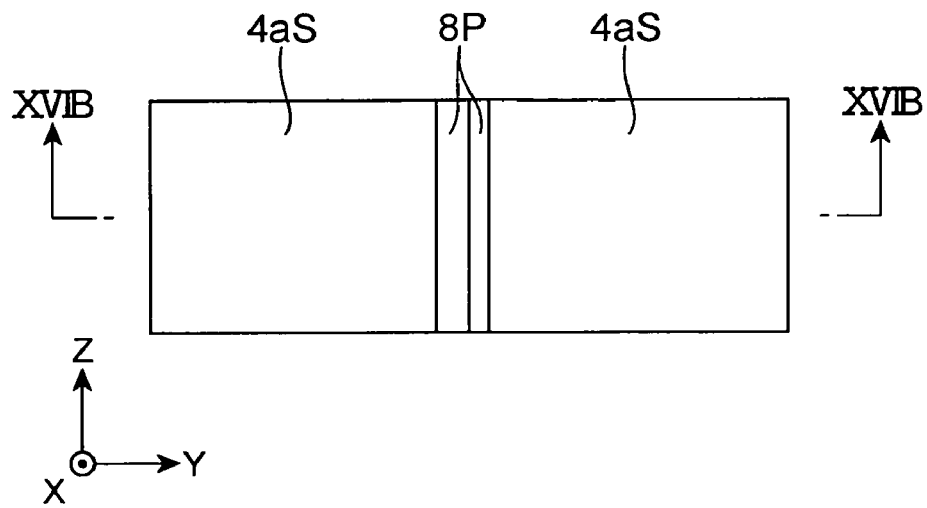
FIG. 16A is a plan-view diagram of an intermediate of the thermally assisted magnetic head, for explaining a manufacturing method thereof.
Figure 16B:
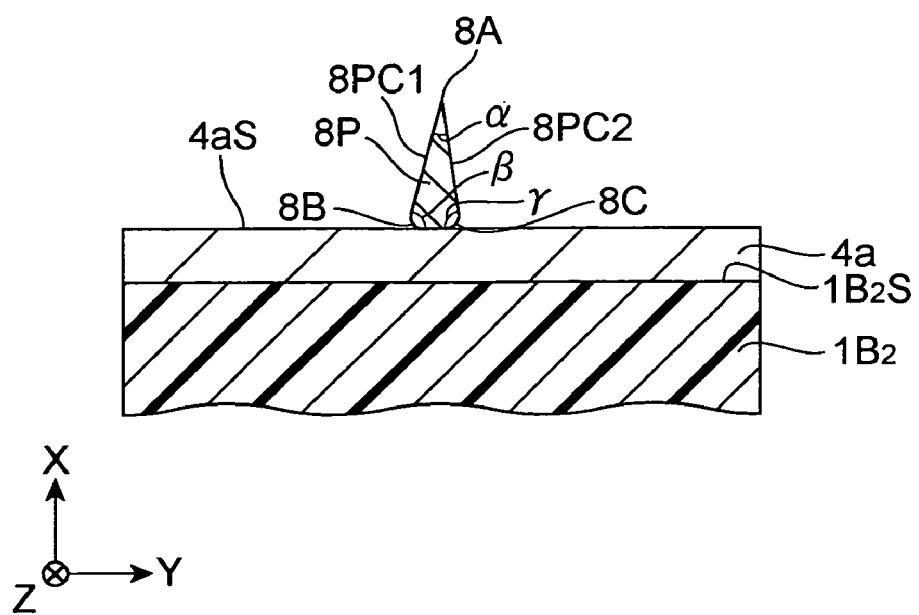
FIG. 16B is a cross-sectional diagram of an intermediate of the thermally assisted magnetic head, for explaining a manufacturing method thereof.

The third corner 8C is rounded next, as illustrated in FIGS. 16A and 16B, through further etching of the metal layer 8P, for instance by dry etching such as ion milling using argon ions, employing the second mask layer 17 as a mask, while removing in the process the second mask layer 17 remaining on the first inclined surface 8PC1. The radius of curvature R8C of the third corner 8C ranges preferably from 10 nm to 30 nm. The dimension of the radius of curvature R8C is controlled, and the second mask layer 17 remaining on the first inclined surface 8PC1 is removed, by adjusting the thickness of the second mask layer 17 and the dry etching conditions, for instance the bombardment angle of argon ions during etching of the metal layer 8P by ion milling (incidence angle of argon ions onto the stacking surface 8PS of the metal layer 8P).

The etching rate of the metal layer 8P during rounding of the third corner 8C through further etching of the metal layer 8P using the second mask layer 17 as a mask, as described above, is preferably greater than the etching rate of the insulating layer 4a (the insulator layer $1B_2$, when the insulating layer 4a is not provided). That way, the insulating layer 4a (or the insulator layer $1B_2$) can function as an etching stop layer during rounding of the third corner 8C through etching of the metal layer 8P. The radius of curvature R8C of the third corner 8C can be controlled easily thereby. In particular, the etching rate selectivity of the metal layer 8P relative to the insulating layer 4a (value obtained by dividing the value of the etching rate of the metal layer 8P by the value of the etching rate of the insulating layer 4a (or the insulator layer $1B_2$)) is preferably 18 or greater, since in that case the radius of curvature R8C of the third corner 8C can be controlled particularly easily.

Figure 17A:
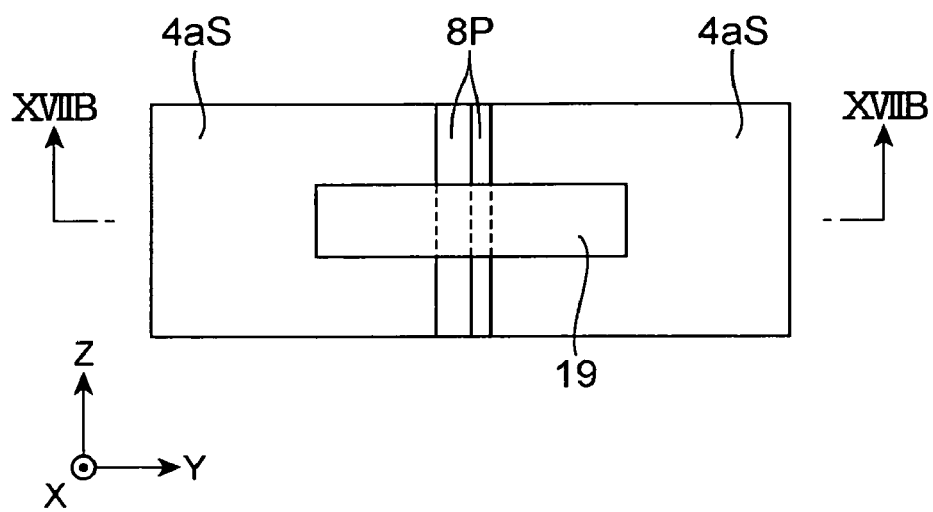
FIG. 17A is a plan-view diagram of an intermediate of the thermally assisted magnetic head, for explaining a manufacturing method thereof.
Figure 17B:
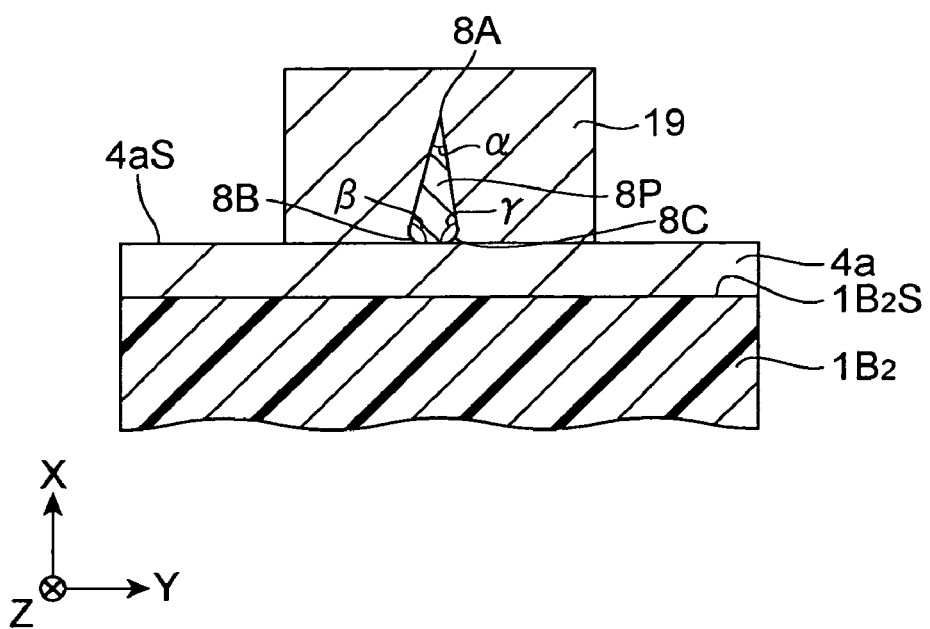
FIG. 17B is a cross-sectional diagram of an intermediate of the thermally assisted magnetic head, for explaining a manufacturing method thereof.

A resist layer 19 is formed next on the triangular prism into which the metal layer 8P has been fabricated, with the resist layer 19 covering part of the triangular prism in the extension direction thereof, as illustrated in FIGS. 17A and 17B.

Figure 18A:
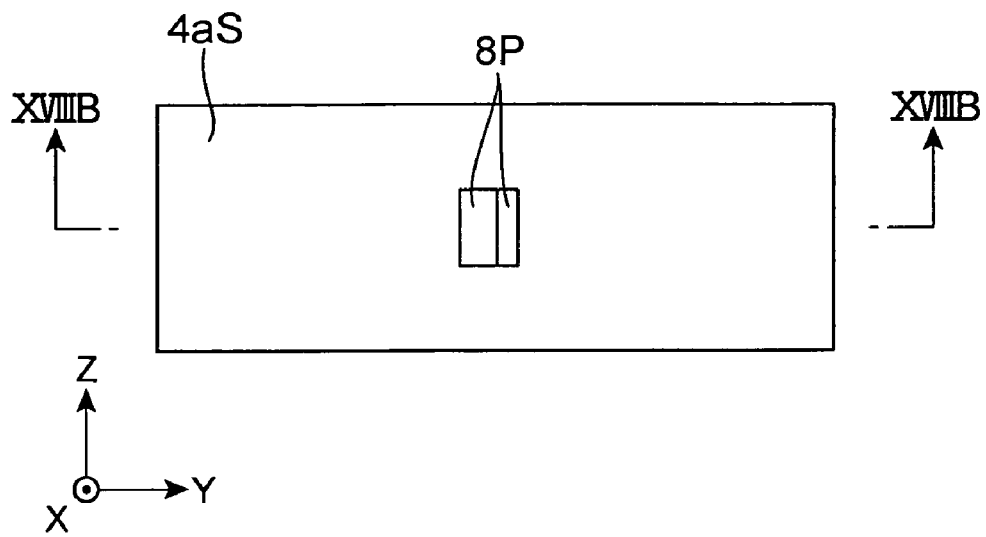
FIG. 18A is a plan-view diagram of an intermediate of the thermally assisted magnetic head, for explaining a manufacturing method thereof.
Figure 18B:
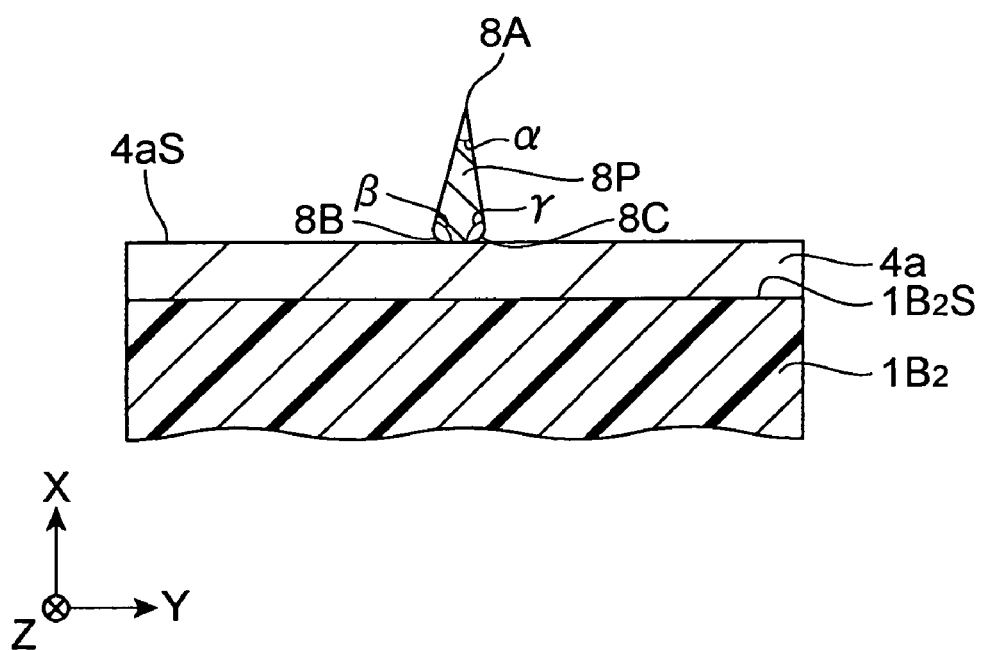
FIG. 18B is a cross-sectional diagram of an intermediate of the thermally assisted magnetic head, for explaining a manufacturing method thereof.

The area of the metal layer 8P not masked by the resist layer 19 is removed, as illustrated in FIGS. 18A and 18B, by dry etching, for instance by ion milling using argon ions. As a result, the metal layer 8P is fabricated into a triangular plate the thickness direction whereof is the Z-axis direction.

Figure 19A:
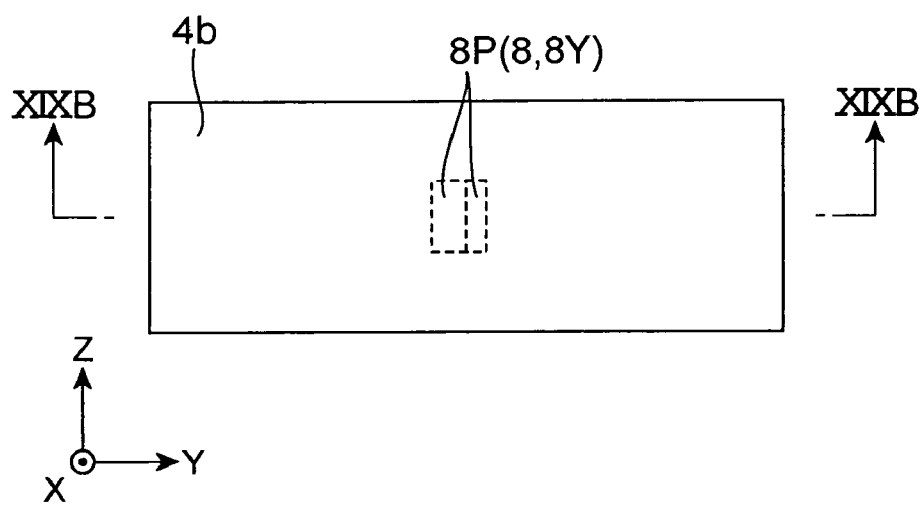
FIG. 19A is a plan-view diagram of an intermediate of the thermally assisted magnetic head, for explaining a manufacturing method thereof.
Figure 19B:
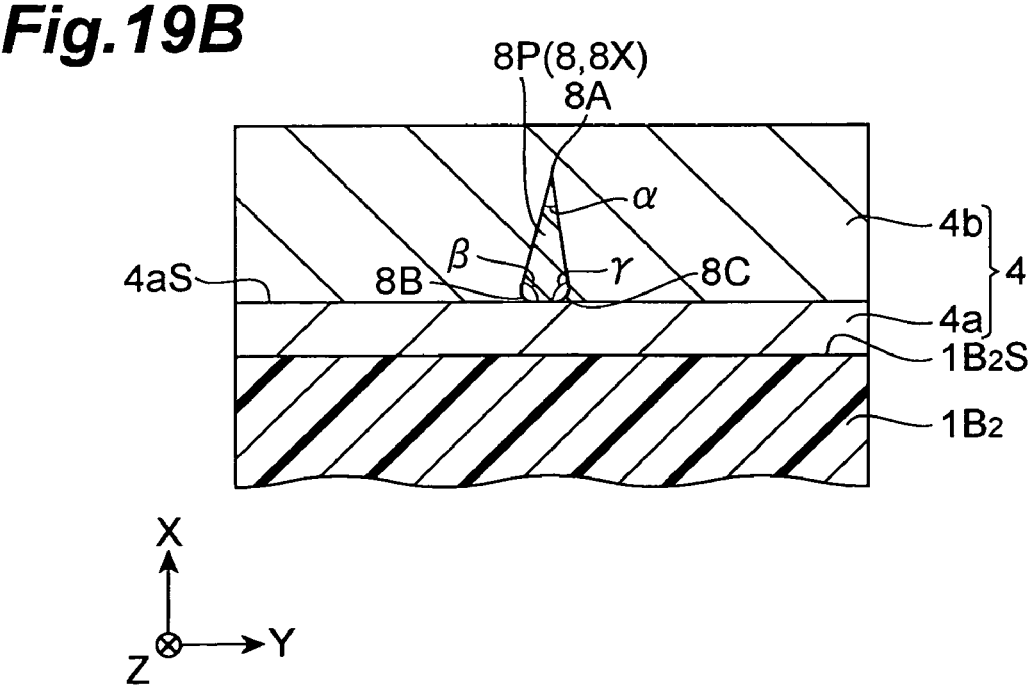
FIG. 19B is a cross-sectional diagram of an intermediate of the thermally assisted magnetic head, for explaining a manufacturing method thereof.

Thereafter, an insulating layer 4b comprising the same material as the insulating layer 4a is formed, for instance by sputtering, over the entire surface, followed by flattening of the top, as illustrated in FIGS. 19A and 19B. The insulating layer 4a and the insulating layer 4b make up the core 4. The metal layer 8P, fabricated as described above, becomes the plasmon antenna 8. As illustrated in FIG. 4, the plasmon antenna 8 has a front face 8X on the XY plane, corresponding to the medium-facing surface S, and side faces 8Y that define the thickness of the plasmon antenna 8 in the Z-axis direction.

The main magnetic pole 6A, the coil 5, the magnetic material layer 6B, the overcoat layer $1B_3$ and so forth are formed on the core 4 in accordance with known methods. The slider substrate 1A is sliced in the XY plane to manufacture a slider bar having the medium-facing surface S (FIG. 4). The MR height of the MR element 7 (length in the direction perpendicular to the medium-facing surface S) and the thickness T8 of the plasmon antenna 8 (FIG. 6) are adjusted to a predetermined size by lapping the medium-facing surface S in the positive direction of the Z-axis. The slider bar is then divided into individual elements, and the light source unit 2, having mounted thereon the light-emitting element 3, is bonded to the slider substrate 1A of the slider 1, to complete the thermally assisted magnetic head (FIG. 4).

The method for manufacturing the thermally assisted magnetic head of the above-described embodiment yields the thermally assisted magnetic head 21 of the embodiment above, namely the thermally assisted magnetic head 21 comprising the plasmon antenna 8 in which the relative intensity of near-field light generated in the vicinity of the first corner 8A, located closest to the main magnetic pole 6A, is made sufficiently strong.

The effect of the present invention and preferred conditions relating to the plasmon antenna will be further clarified in the explanation below by way of examples and comparative examples.

In the models of the plasmon antennas of the examples and comparative examples of the present invention, the intensity of near-field light emitted from the vicinity of respective corners was calculated by simulation, the purpose of which was to illustrate that changing the shape of a triangular plasmon antenna having no rounded corners into a shape in which some of the corners are rounded results in a stronger relative intensity of near-field light generated at other corners.

Figure 20A:
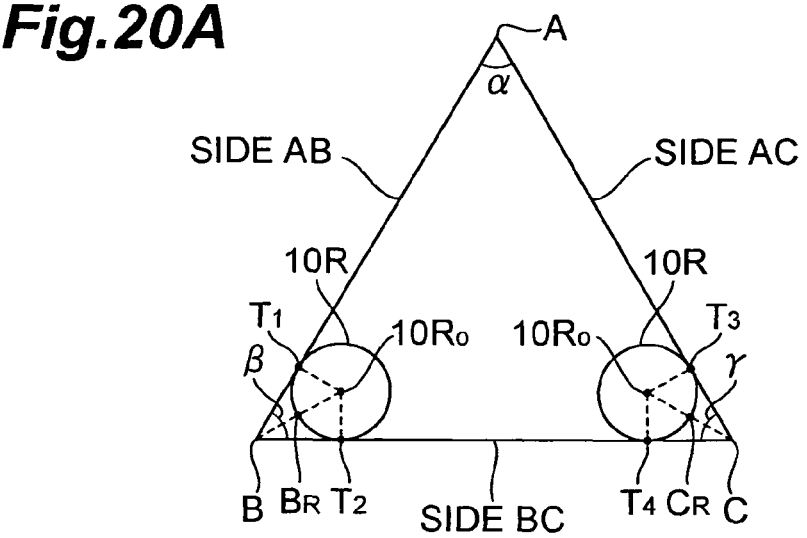
FIG. 20A is a plan-view diagram for explaining the shape of plasmon antennas in comparative examples.
Figure 20B:
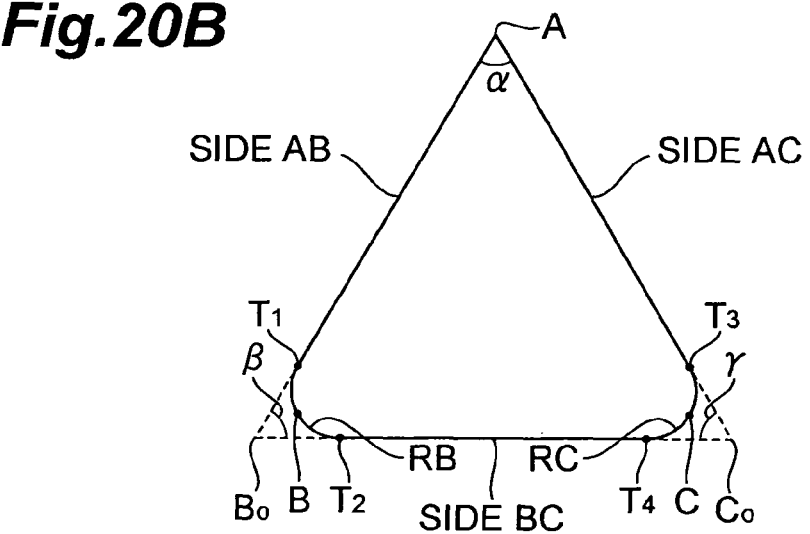
FIG. 20B is a plan-view diagram for explaining the shape of plasmon antennas in examples.
Figure 20C:
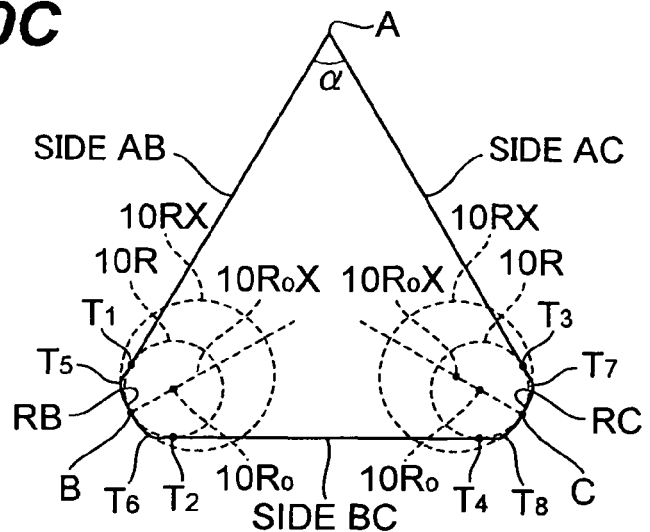
FIG. 20C is a cross-sectional diagram for explaining the shape of a plasmon antenna in examples.

A plasmon antenna having a bilaterally symmetrical plan-view shape will be considered first. An explanation follows next on models of plasmon antennas in examples and comparative examples involving such a bilaterally symmetrical plan-view shape. FIG. 20A is a plan-view diagram for explaining the shape of plasmon antennas in the comparative examples; and FIG. 20B and FIG. 20C are plan-view diagrams for explaining the shape of plasmon antennas in the examples. The plasmon antennas in the examples and comparative examples have a corner A, a corner B and a corner C, the interior angle of corner A being $\alpha$, the interior angle of corner B being $\beta$ and the interior angle of corner C being $\gamma$. The plasmon antennas in the examples and comparative examples have a side AB joining corner A to corner B, a side BC joining corner B to corner C, and a side AC joining corner A to corner C. Corner A, corner B and corner C correspond respectively to the first corner 8A, second corner 8B and third corner 8C in the above-described embodiment (FIG. 7). The interior angle $\alpha$, interior angle $\beta$ and interior angle $\gamma$ correspond respectively to the interior angle $\alpha$, interior angle $\beta$ and interior angle $\gamma$ in the above-described embodiment.

In the plasmon antenna illustrated in FIG. 20A, corner A, corner B and corner C are not rounded, and hence corner A, corner B and corner C form each a vertex. Also, the plasmon antenna of FIG. 20A satisfies the condition $\beta=\gamma$. That is, the plan-view shape of the plasmon antenna of FIG. 20A is bilaterally symmetrical relative to a perpendicular line drawn from corner A to side BC.

The plasmon antennas of the examples are explained next with reference to FIG. 20A and FIG. 20B. In the plasmon antenna of the examples illustrated in FIG. 20B, the radii of curvature RB, RC of corner B and corner C are each 10 nm. Corner B and corner C are rounded, and hence they do not form vertices. The plasmon antenna of the examples illustrated in FIG. 20B is a deformation of the plasmon antenna of the comparative examples of FIG. 20A. Specifically, two circles 10R having a radius of 10 nm are provided in the plasmon antenna of FIG. 20A in such a manner so as to touch side AB and side BC at point $T_1$ and point $T_2$, and to touch side AC and side BC at point $T_3$ and $T_4$, respectively. Straight lines drawn from the centers $10R_0$ of the two circles 10R up to corner B and corner C intersect the two circles 10R at intersection point $B_R$ and intersection point $C_R$, respectively. The shape of the plasmon antenna of the examples of FIG. 20B is a triangular shape formed by a straight line from corner A to point $T_1$, part of the circumference of one circle 10R, from point $T_1$ to point $T_2$ via intersection point $B_R$, a straight line from point $T_2$ to point $T_4$, part of the circumference of one circle 10R, from point $T_4$ to point $T_3$ via intersection point $C_R$, and a straight line from point $T_3$ to corner A. Corner B and corner C of FIG. 20B correspond to intersection point $B_R$ and intersection point $C_R$ of FIG. 20A, respectively, and point $B_0$ and point $C_0$ of FIG. 20B correspond to corner B and corner C of FIG. 20A, respectively. Point $B_0$ and point $C_0$ of FIG. 20B correspond respectively to intersection points $8B_0$ and $8C_0$ in the above-described embodiment (FIG. 7). As illustrated in FIG. 20B, thus, the radii of curvature RB, RC of corner B and corner C of the plasmon antenna of the examples are both 10 nm (i.e., the radii of curvature of corner B and corner C are identical).

In the plasmon antenna of the examples illustrated in FIG. 20C, the radii of curvature RB, RC of corner B and corner C are both greater than 10 nm. Also, corner B and corner C are rounded, and form thus no vertices. The plasmon antenna of the examples illustrated in FIG. 20C is a deformation of the plasmon antenna of the comparative examples of FIG. 20B. Specifically, as illustrated in FIG. 20C, a triangular shape that runs through corner A-point $T_1$-corner B-point $T_2$-point $T_4$-corner C-point $T_3$-corner A (i.e. the triangular shape illustrated in FIG. 20B) has defined therein a center $10R_0X$ at a point on a straight line extending from corner B to the center $10R_0$ of a circle 10R, at a distance no smaller than 10 nm from corner B; and points $T_5$ and $T_6$ at respective intersections of sides AB and BC with the circle 10RX that passes through corner B. Similarly, the triangular shape that runs through corner A-point $T_1$-corner B-point $T_2$-point $T_4$-corner C-point $T_3$-corner A (i.e. the triangular shape illustrated in FIG. 20B) has defined therein a center $10R_0X$ at a point on a straight line extending from corner B to the center $10R_0$ of a circle 10R, at a distance no smaller than 10 nm from corner C; and points $T_7$ and $T_8$ at respective intersections of sides AC and BC with the circle 10RX that passes through corner C. Thus, the shape of the plasmon antenna of the examples of FIG. 20C is a triangular shape formed by a straight line from corner A to point $T_5$; part of the circumference of the circle 10RX, from point $T_5$ to point $T_6$ via corner B; a straight line from point $T_6$ to point $T_8$; part of the circumference of the circle 10RX, from point $T_8$ to point $T_7$ via corner C; and a straight line from point $T_7$ to corner A. In the plasmon antenna of the examples illustrated in FIG. 20C, the radius of curvature RB of corner B and the radius of curvature RC of corner C are identical and greater than 10 nm. Also, the plasmon antennas of the examples illustrated in FIGS. 20B and 20C satisfy the condition $\beta=\gamma$. The material making up the plasmon antennas of the examples and comparative examples is Au or Ag.

The near-field light emission intensity emitted by respective corners in the plasmon antennas of the examples and comparative examples was calculated by simulation. As conditions of the simulation, the distance from a light incidence surface (equivalent to the light incidence surface 4A of FIG. 4) to the plasmon antenna was kept constant, and the center of the light incidence surface coincided with the center of the plan-view shape of the plasmon antenna. The excitation light striking the plasmon antenna was a plane wave having a uniform intensity distribution. The near-field light emission intensity generated by the respective corners of the plasmon antenna was computed by 3D-FDTD, segmenting the plasmon antenna into a 0.3 nm square mesh. Unless otherwise stated, the wavelength of the excitation light striking the plasmon antenna in the simulation results explained below was 650 nm.

FIG. 21 illustrates shape conditions of the plasmon antennas of Comparative example 1 and Examples 1 to 5. As illustrated in FIG. 21, $\alpha$, $\beta$ and $\gamma$ were all 60 degrees, the length of side AB was 100 nm and the material was Au in all the plasmon antennas of Comparative example 1 and Examples 1 to 5. The radii of curvature of corner B and corner C of the plasmon antennas of Comparative example 1 and Examples 1 to 5 were 0, 10, 15, 20, 25 and 30 nm, respectively. That is, the plasmon antennas of Comparative example 1 and Examples 1 to 5 are equilateral triangles having a sharp corner A and the radii of curvature of corner B and corner C as parameters. Comparative example 1 corresponds to the plasmon antenna of FIG. 20A, Example 1 corresponds to the plasmon antenna of FIG. 20B, and Examples 2 to 5 correspond to the plasmon antenna of FIG. 20C. In the examples, the length of side AB refers to the distance from corner A to intersection point $B_0$ (FIG. 20B).

Figure 22:
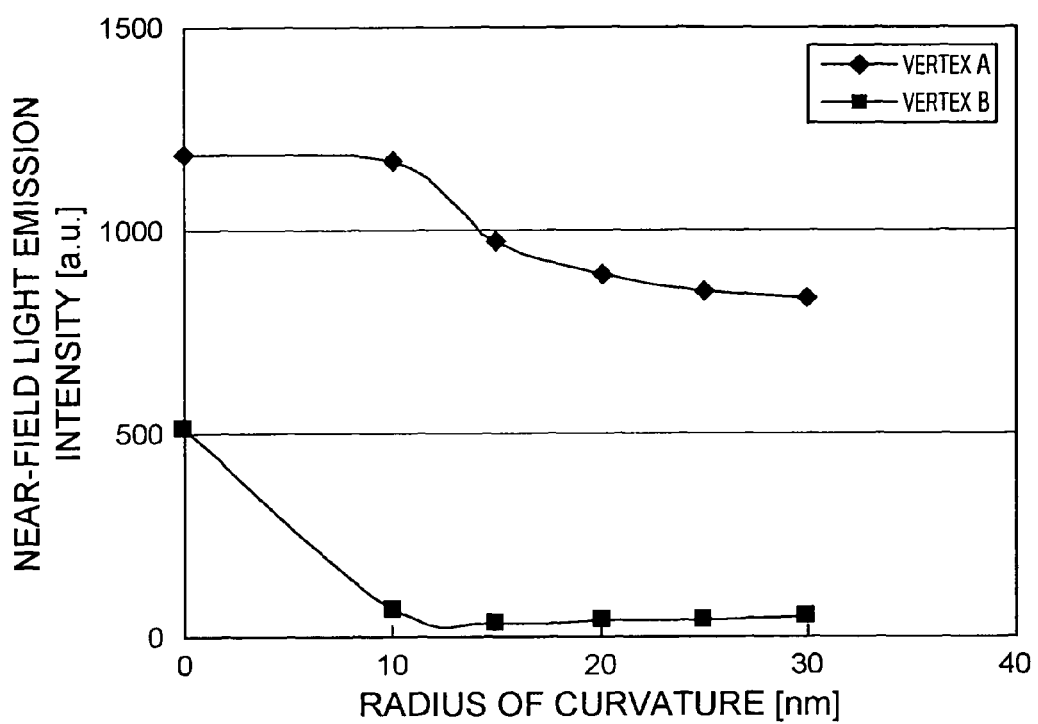
FIG. 22 is a diagram illustrating simulation results in examples and comparative examples.
Figure 23:
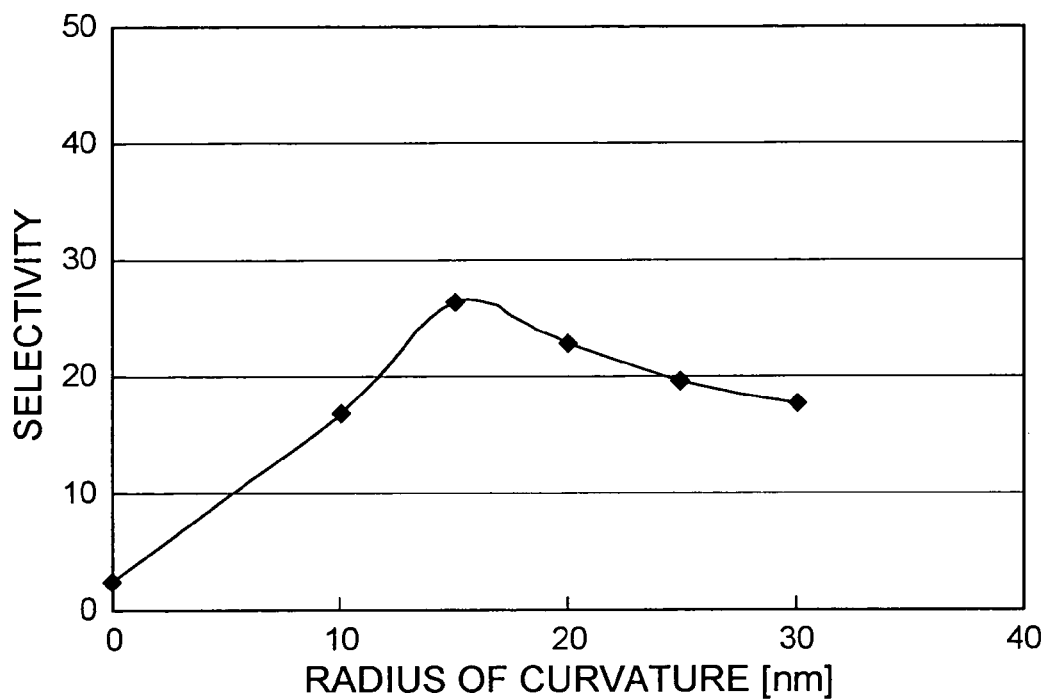
FIG. 23 is a diagram illustrating simulation results in examples and comparative examples.

FIG. 22 and FIG. 23 are diagrams illustrating simulation results of Comparative example 1 and Examples 1 to 5. FIG. 22 illustrates the dependence on radius of curvature of the intensity of near-field light generated at corner A and corner C. As illustrated in FIG. 22, the intensity of near-field light generated at the not-rounded corner A tends to decrease slightly as the radii of curvature of corner B and corner C become greater. However, the intensity of near-field light generated at corner B, which is rounded, drops considerably. FIG. 23 illustrates the dependence of selectivity on the radius of curvature. Selectivity is herein a value obtained by dividing the value of near-field light intensity generated at corner A by the value of near-field light intensity generated at corner B. The selectivity value denotes the relative intensity of near-field light generated at corner A. As illustrated in FIG. 23, selectivity increases when the radii of curvature of corner B and corner C are greater than 0 (Examples 1 to 5), i.e. when corner B and corner C are rounded, than when the radii of curvature are 0 (Comparative example 1), i.e. when corner B and corner C are not rounded. In a plasmon antenna shaped as an equilateral triangle, thus, selectivity is greater when corner B and corner C are rounded than when corner B and corner C are not rounded. In terms of achieving a large enough selectivity, in particular, the radii of curvature of corner B and corner C range preferably from 10 nm to 30 nm. The results in the above-described examples and comparative examples, as well as the results in the below-described examples and comparative examples are based on simulations, and hence, needless to say, they may contain some errors.

FIG. 24 illustrates shape conditions of the plasmon antennas of Comparative example 2 and Examples 6 to 10. Except for the material, the shape conditions of the plasmon antennas of Comparative example 2 and Examples 6 to 10 are identical to those of the above-described plasmon antennas of Comparative example 1 and Examples 1 to 5, as illustrated in FIG. 24. The material in the plasmon antennas of Comparative example 2 and Examples 6 to 10 was Ag. The purpose of Comparative example 2 and Examples 6 to 10 is to study the influence of changing the material of the plasmon antenna from Au to Ag.

Figure 25:
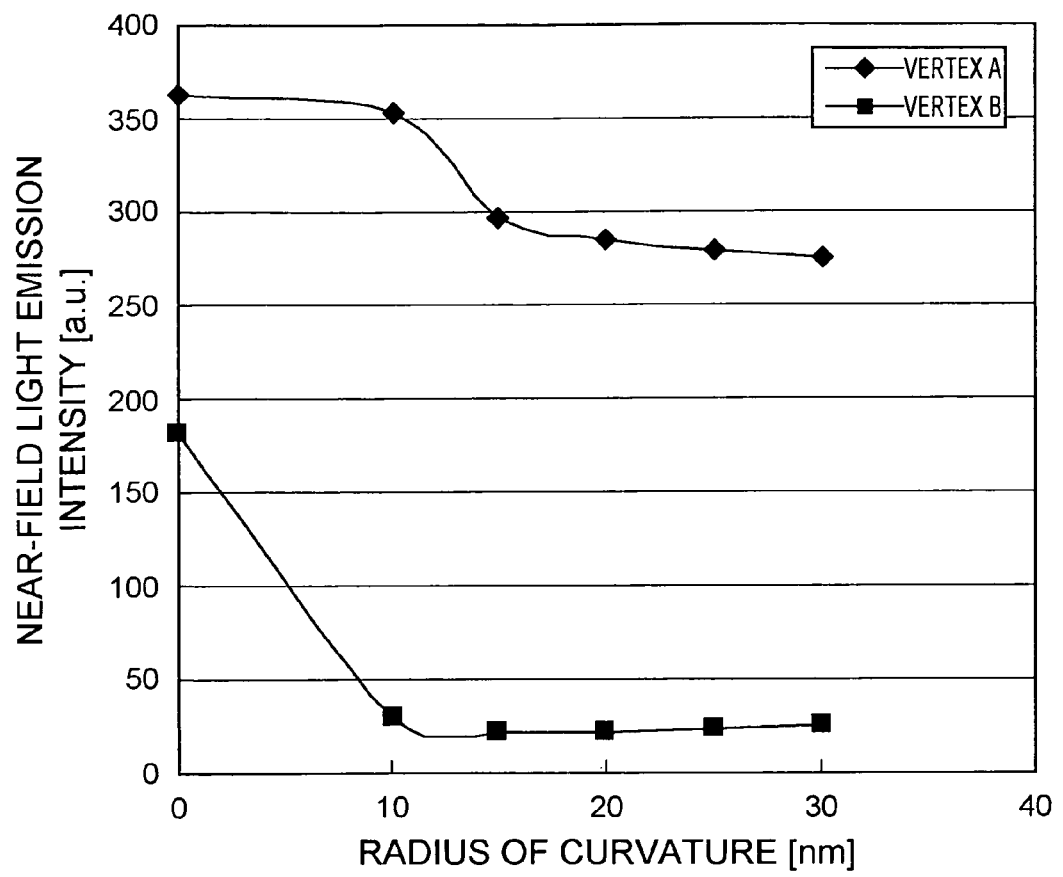
FIG. 25 is a diagram illustrating simulation results in examples and comparative examples.
Figure 26:
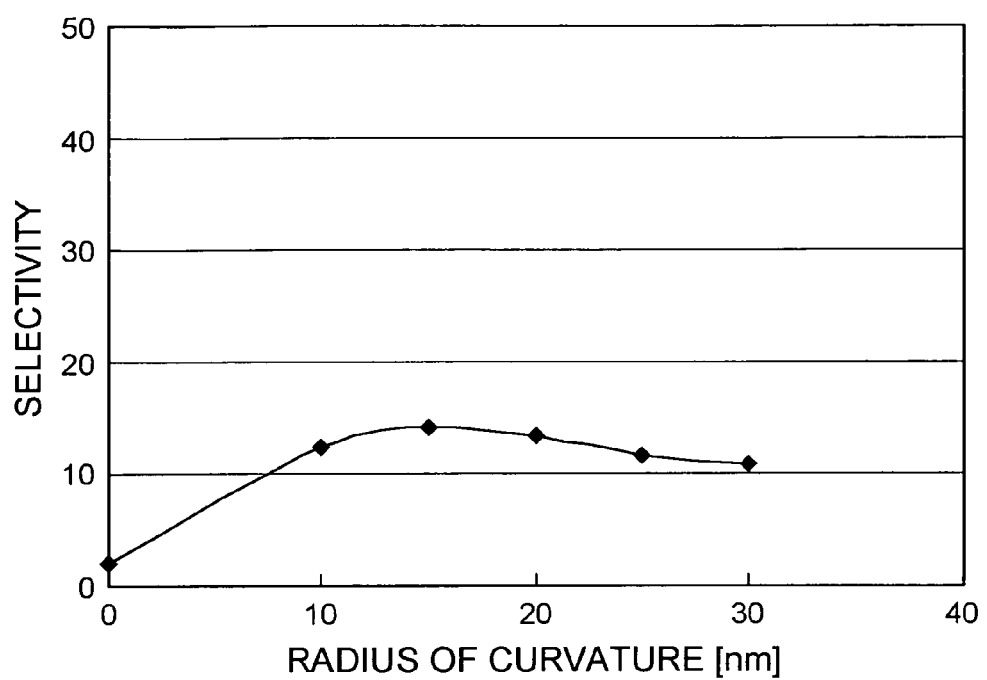
FIG. 26 is a diagram illustrating simulation results in examples and comparative examples.

FIG. 25 and FIG. 26 are diagrams illustrating simulation results of Comparative example 2 and Examples 6 to 10. FIG. 25 illustrates the dependence on radius of curvature of the intensity of near-field light generated at corner A and corner C. FIG. 26 illustrates the dependence of selectivity on the radius of curvature. FIG. 25 and FIG. 26 illustrate the same trend as FIG. 22 and FIG. 23. As illustrated in FIG. 25, specifically, the intensity of near-field light generated at the not-rounded corner A tends to decrease slightly as the radii of curvature of corner B and corner C become greater. However, the intensity of near-field light generated at corner B, which is rounded, drops considerably. As illustrated in FIG. 26, selectivity increases when the radii of curvature of corner B and corner C are greater than 0 (Examples 6 to 10), i.e. when corner B and corner C are rounded, than when the radii of curvature are 0 (Comparative example 2), i.e. when corner B and corner C are not rounded. In terms of achieving a large enough selectivity, in particular, the radii of curvature of corner B and corner C ranges preferably from 10 nm to 30 nm. It was thus shown that using Au and using Ag as the material comprised in the plasmon antenna results in the same trends as regards near-field light emission characteristics.

FIG. 27 illustrates shape conditions of the plasmon antennas of Comparative example 3 and Examples 11 to 15. As illustrated in FIG. 27, $\alpha$, $\beta$ and $\gamma$ were 30 degrees, 75 degrees and 75 degrees, the length of side AB was 150 nm and the material was Au in all the plasmon antennas of Comparative example 3 and Examples 11 to 15. The radii of curvature of corner B and corner C of the plasmon antennas of Comparative example 3 and Examples 11 to 15 were 0, 10, 15, 20, 25 and 30 nm, respectively. That is, the plasmon antennas of Comparative example 3 and Examples 11 to 15 are isosceles triangles having a sharp corner A and the radii of curvature of corner B and corner C as parameters. The purpose of Comparative example 3 and Examples 11 to 15 is to study the influence of a sharper corner A.

Figure 28:
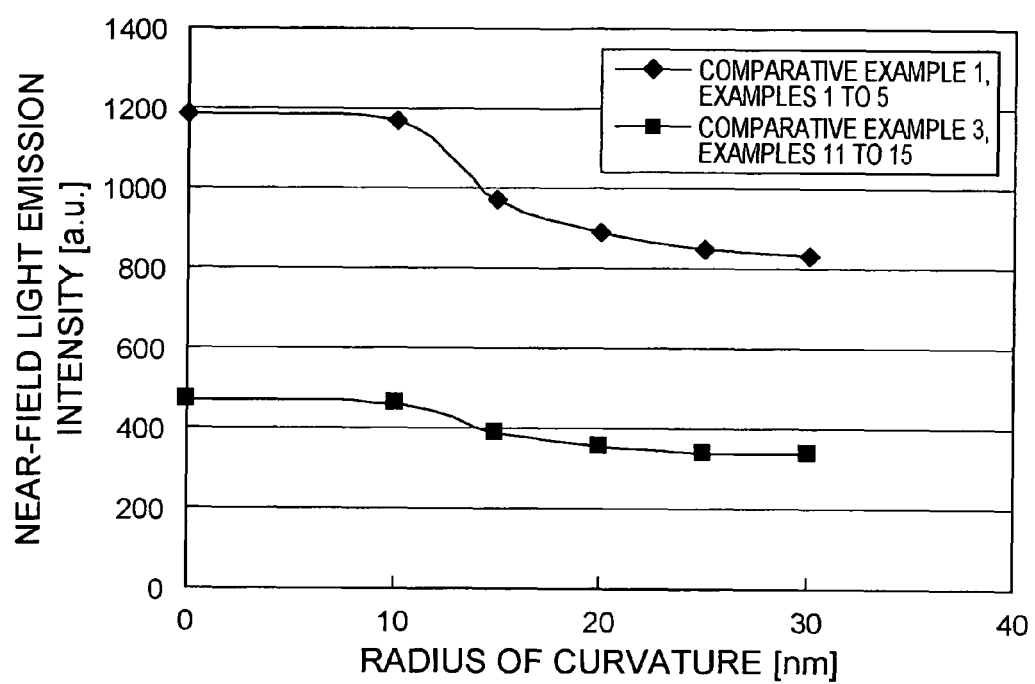
FIG. 28 is a diagram illustrating simulation results in examples and comparative examples.
Figure 29:
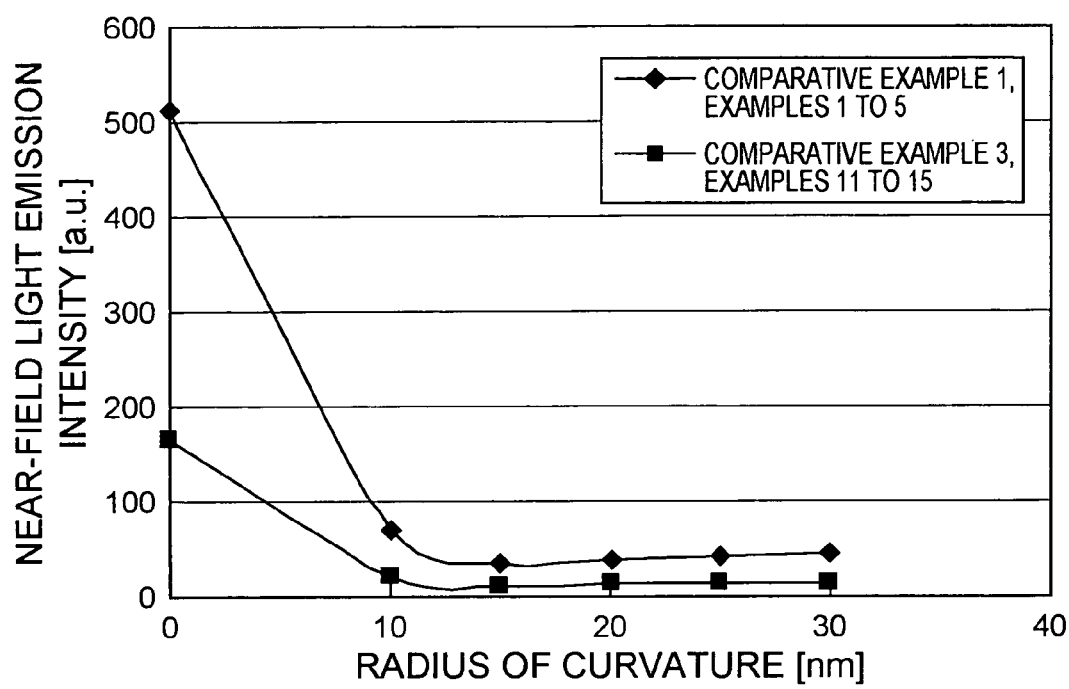
FIG. 29 is a diagram illustrating simulation results in examples and comparative examples.
Figure 30:
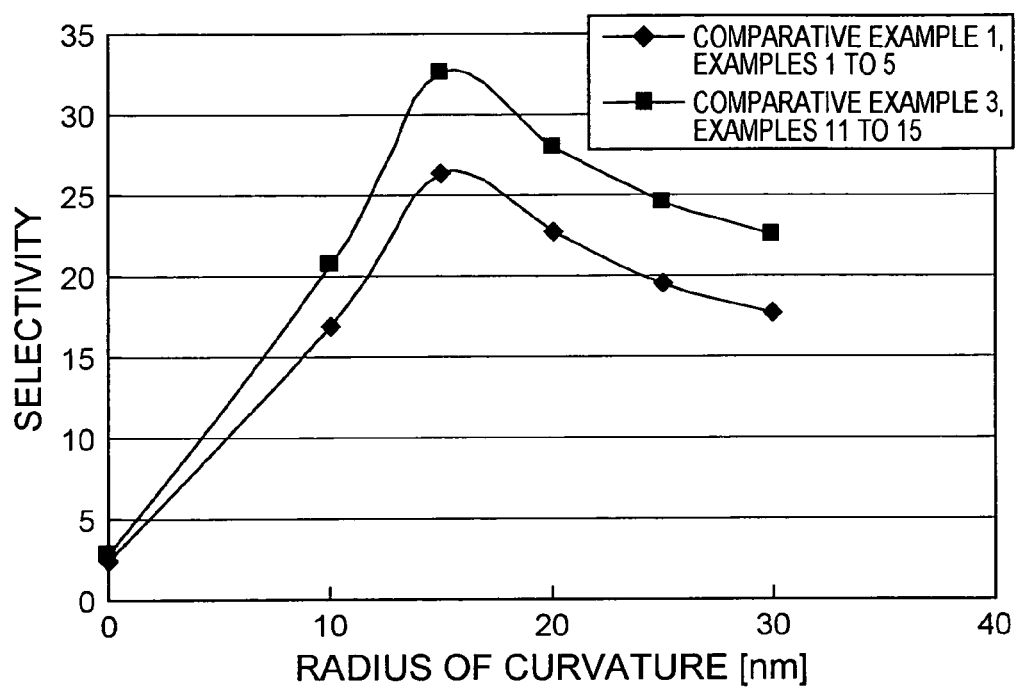
FIG. 30 is a diagram illustrating simulation results in examples and comparative examples.

FIG. 28 to FIG. 30 are diagrams illustrating simulation results of Comparative example 3 and Examples 11 to 15 combined with the simulation results of Comparative example 1 and Examples 1 to 5. FIG. 28 illustrates the dependence on radius of curvature of the intensity of near-field light generated at corner A. In Comparative example 3 and Examples 11 to 15, as illustrated in FIG. 28, the intensity of near-field light generated at corner A tends to decrease slightly as the radii of curvature of corner B and corner C become greater, as is the case in Comparative example 1 and Examples 1 to 5. FIG. 29 illustrates the dependence on radius of curvature of the intensity of near-field light generated at corner B. In Comparative example 3 and Examples 11 to 15, as illustrated in FIG. 29, the intensity of near-field light generated at corner B tends to drop considerably as the radii of curvature of corner B and corner C become greater, as is the case in Comparative example 1 and Examples 1 to 5. FIG. 30 illustrates the dependence of selectivity on the radius of curvature. In Comparative example 3 and Examples 11 to 15, as illustrated in FIG. 30, selectivity increases when the radii of curvature of corner B and corner C are greater than 0, i.e. when corner B and corner C are rounded, than when the radii of curvature are 0, i.e. when corner B and corner C are not rounded, as is the case in Comparative example 1 and Examples 1 to 5. In a plasmon antenna shaped as an isosceles triangle, thus, selectivity is greater when corner B and corner C are rounded than when corner B and corner C are not rounded. These results indicate that the near-field light emission characteristic shows the same trend both when corner A of the plasmon antenna is sharpened and when corner A of the plasmon antenna is not sharpened.

Next there were studied plasmon antennas having a bilaterally asymmetrical plan-view shape in which corner B and corner C are rounded. An explanation follows next on models of plasmon antennas in examples involving such a bilaterally symmetrical plan-view shape with reference to FIGS. 31A and 31B.

Figure 31A:
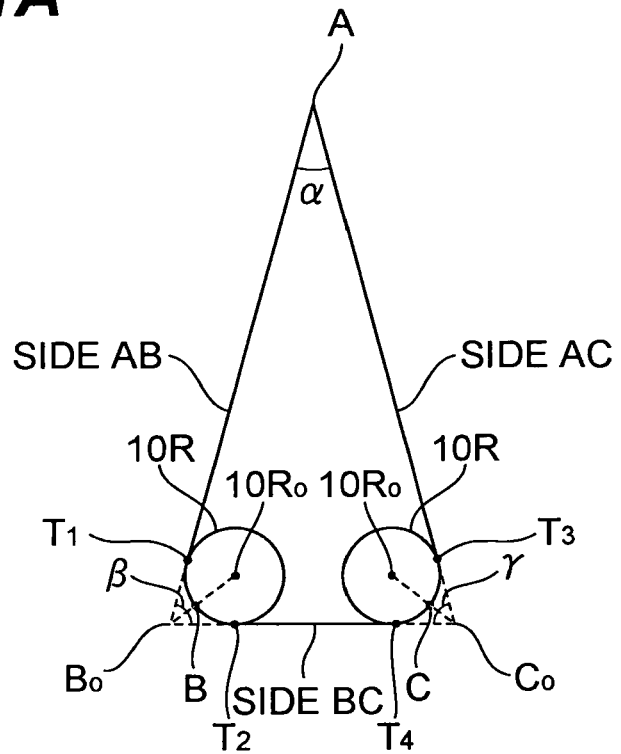
FIG. 31A is a diagram for explaining a model of plasmon antenna in examples.
Figure 31B:
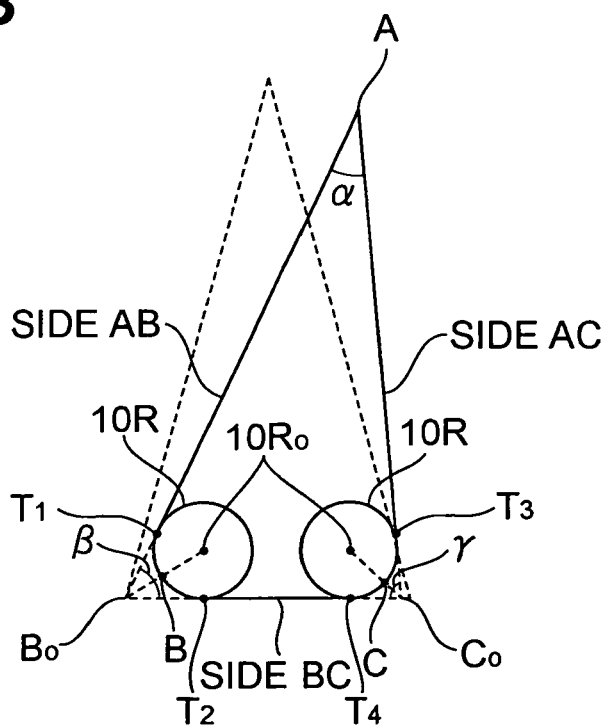
FIG. 31B is a diagram for explaining a model of plasmon antenna in examples.

FIG. 31A is a diagram corresponding to FIG. 20B. That is, FIG. 31A illustrates a plasmon antenna having a bilaterally symmetrical plan-view shape, in which corner B and corner C are rounded, as a triangular shape formed by a straight line from corner A to point $T_1$, part of the outer circumference of one circle 10R, from point $T_1$ to point $T_2$ via vertex B, a straight line from point $T_2$ to point $T_4$, part of the outer circumference of one circle 10R, from point $T_4$ to point $T_3$ via vertex C, and a straight line from point $T_3$ to corner A. The plasmon antenna of FIG. 31B is a deformation of the basic-shape plasmon antenna of FIG. 31A (denoted by a dotted line in FIG. 31B).

Specifically, the plasmon antenna of FIG. 31A is deformed by reducing the interior angle $\beta$ through clockwise rotation of side AB around point $B_0$ while keeping fixed the length of side AB and the dimension of angle $\alpha$. The intersection point of side AB and side AC yields then a new point $C_0$. The triangular shape comprising thus corner A, point $B_0$ and $C_0$ is then deformed in the same way as in the deformation from FIG. 20A to 20B. That is, two circles 10R having a radius of 10 nm are provided in the triangular shape comprising corner A, point $B_0$ and point $C_0$ of FIG. 31B in such a manner so as to touch side AB and side BC at point $T_1$ and point $T_2$, and to touch side AC and side BC at point $T_3$ and point $T_4$, respectively. Corner B and corner C form at the intersection points of two circles 10R and straight lines drawn from the centers $10R_0$ of the two circles 10R up to point $B_0$ and point $C_0$, respectively. Thus, the shape of the plasmon antenna of the examples is a triangular shape formed by a straight line from corner A to point $T_1$, part of the outer circumference of one circle 10R, from point $T_1$ to point $T_2$ via vertex B, a straight line from point $T_2$ to point $T_4$, part of the outer circumference of one circle 10R, from point $T_4$ to point $T_3$ via vertex C, and a straight line from point $T_3$ to corner A. Such a plasmon antenna of FIG. 31B has rounded corners B and C and a bilaterally asymmetrical plan-view shape. The plasmon antenna of FIG. 31B satisfies the relationship $\beta \neq \gamma$. That is, the plan-view shape of the plasmon antenna of FIG. 31B is bilaterally asymmetrical relative to a perpendicular line drawn from corner A to side BC.

FIG. 32 illustrates shape conditions of the plasmon antennas of Comparative examples 3 to 5 and Examples 11, 16 and 17. The angle $\alpha$, side AB and the material of the plasmon antennas of Comparative examples 3 to 5 and Examples 11, 16 and 17 were 30 degrees, 150 nm and Au, respectively. The plasmon antennas of Comparative examples 3 to 5 and Examples 11, 16 and 17 satisfied $\alpha<\beta$, $\alpha<\gamma$. The radii of curvature of corner B and corner C were both 0 in Comparative examples 3 to 5. In Comparative example 3, there was set $\beta=\gamma$ while in Comparative examples 4 and 5 there was set $\beta \neq \gamma$. Except for the radii of curvature, the conditions of the plasmon antennas of Examples 11, 16 and 17 were identical to those of Comparative examples 3 to 5. The radii of curvature of the plasmon antennas of Examples, 11, 16 and 17 were all 10 nm.

Figure 33:
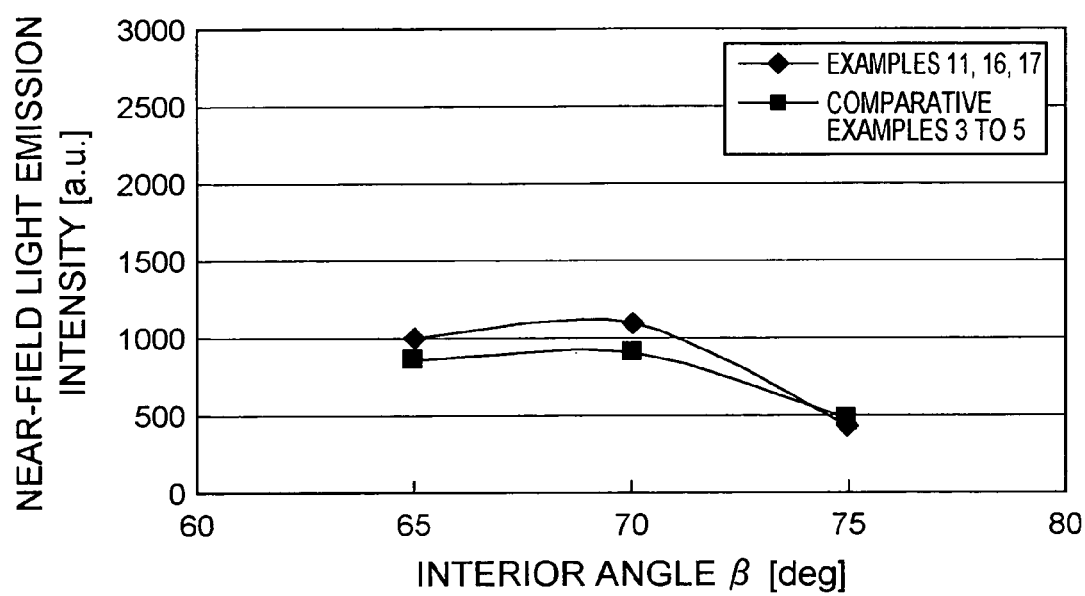
FIG. 33 is a diagram illustrating simulation results in examples and comparative examples.
Figure 34:
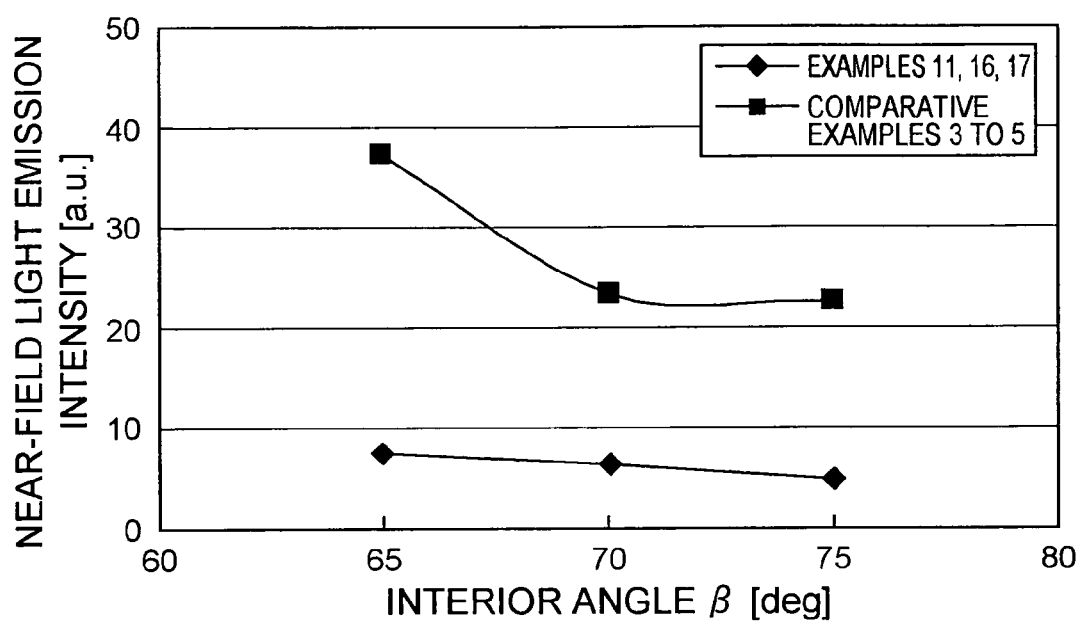
FIG. 34 is a diagram illustrating simulation results in examples and comparative examples.
Figure 35:
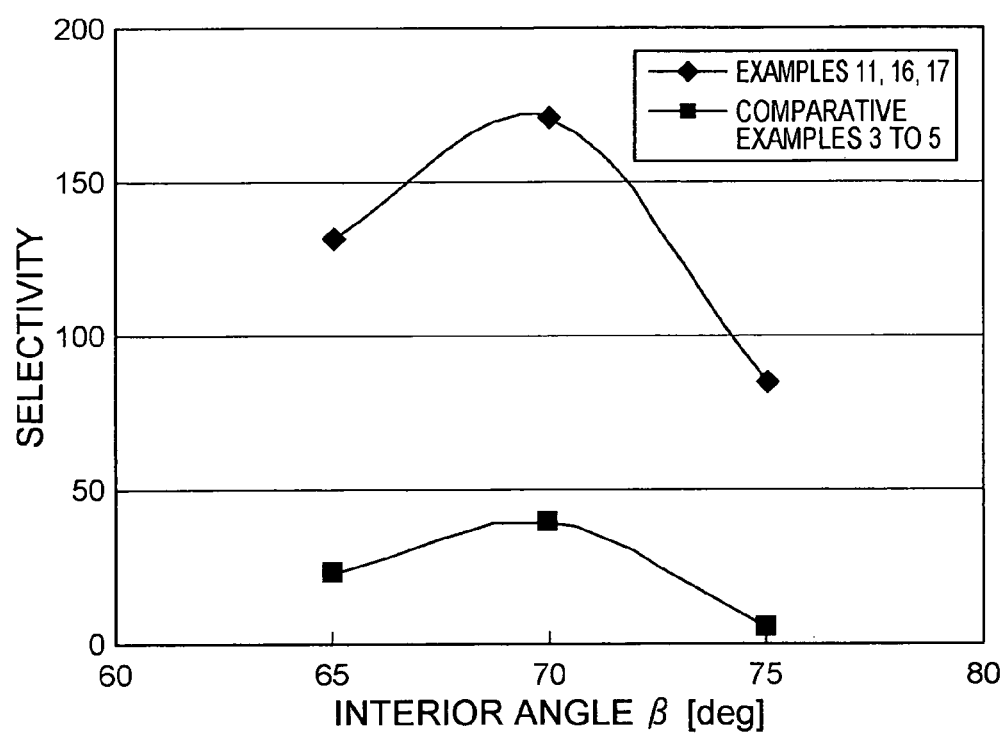
FIG. 35 is a diagram illustrating simulation results in examples and comparative examples.

FIG. 33 to FIG. 37 are diagrams illustrating simulation results of Comparative examples 3 to 5 and Examples 11, 16 and 17. FIG. 33 illustrates the dependence on the interior angle $\beta$ of the intensity of near-field light generated at corner A. As FIG. 33 shows, the intensity of near-field light generated at corner A increases when a bilaterally symmetrical plasmon antenna having an interior angle $\beta$ of 75 degrees changes into a bilaterally asymmetrical plasmon antenna having a smaller value of the interior angle $\beta$. FIG. 34 illustrates the dependence on the interior angle $\beta$ of the intensity of near-field light generated at corner B. As FIG. 34 shows, the intensity of near-field light generated at corner B increases considerably in Comparative examples 3 to 5 when a bilaterally symmetrical plasmon antenna having an interior angle $\beta$ of 75 degrees changes into a bilaterally asymmetrical plasmon antenna having a smaller value of the interior angle $\beta$. By contrast, the increase in intensity of near-field light generated at corner B was curbed in Examples 11, 16 and 17 even when a bilaterally symmetrical plasmon antenna having an interior angle $\beta$ of 75 degrees changes into a bilaterally asymmetrical plasmon antenna having a smaller value of the interior angle $\beta$. FIG. 35 illustrates the dependence of selectivity on the interior angle $\beta$. As FIG. 35 shows, selectivity increases when a bilaterally symmetrical plasmon antenna having an interior angle $\beta$ of 75 degrees changes into a bilaterally asymmetrical plasmon antenna having a smaller value of the interior angle $\beta$, but the increase in selectivity is greater in Examples 11, 16 and 17 than in Comparative examples 3 to 5 (radii of curvature 0). These results indicate that the plasmon antenna has preferably a bilaterally asymmetrical shape in which corner B and corner C are rounded.

Figure 36:
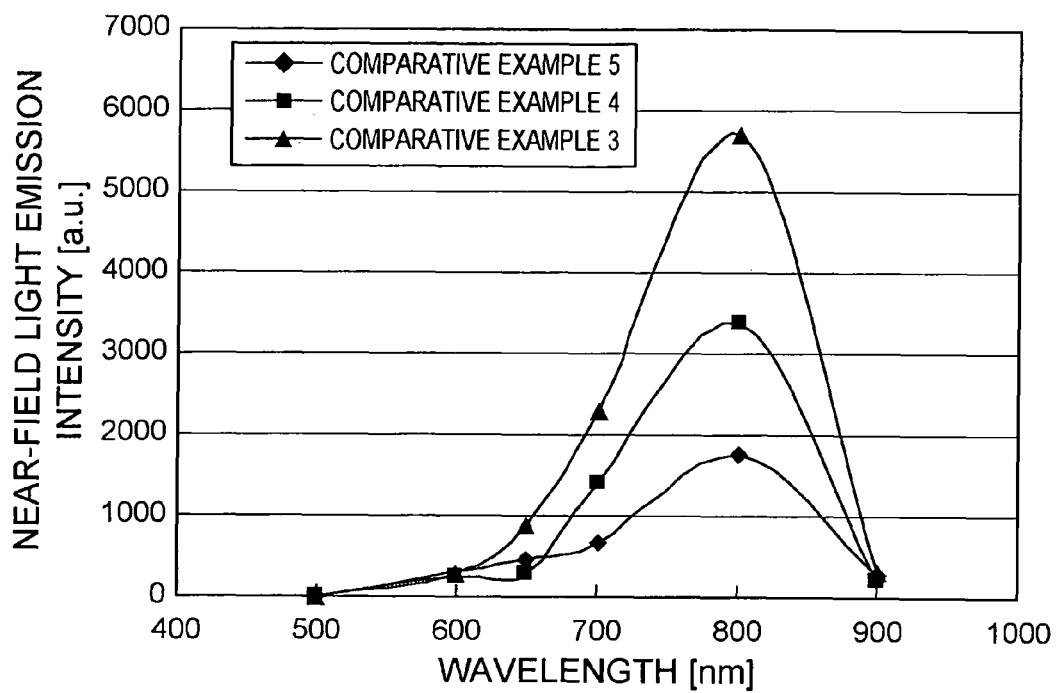
FIG. 36 is a diagram illustrating simulation results in examples and comparative examples.
Figure 37:
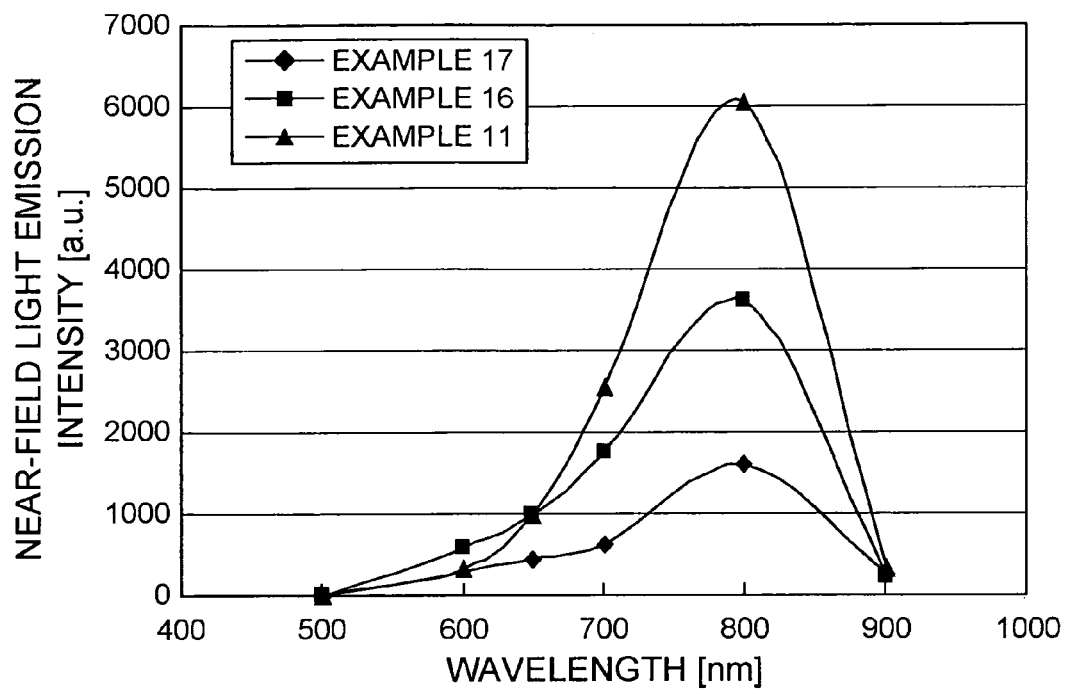
FIG. 37 is a diagram illustrating simulation results in examples and comparative examples.

FIG. 36 is a diagram illustrating the relationship between the wavelength of light striking the plasmon antenna and the intensity of near-field light generated at corner A, upon irradiation of excitation light of various wavelengths onto the plasmon antennas of Comparative examples 3 to 5. FIG. 37 is a diagram illustrating the relationship between the wavelength of light striking the plasmon antenna and the intensity of near-field light generated at corner A, upon irradiation of excitation light of various wavelengths onto the plasmon antennas of Examples 11, 16 and 17. As FIG. 36 and FIG. 37 show, the intensity of near-field light generated at corner A reached a peak when the plasmon antennas were irradiated with an 800 nm wavelength. An asymmetrical plasmon antenna shape (Comparative examples 4 and 5, Examples 16 and 17) resulted in a stronger intensity of near-field light generated at corner A than a symmetrical plasmon antenna shape (Comparative example 3, Example 11), over virtually the entire wavelength range. A comparison between FIG. 36 and FIG. 37 reveals that Examples 11, 16 and 17, in which corner B and corner C of the plasmon antennas are rounded, exhibit stronger absolute intensity of near-field light generated at corner A than Comparative examples 3, 4 and 5, in which corner B and corner C are not rounded, over virtually the entire wavelength range. This indicates that when the shape of the plasmon antenna is an isosceles triangle (FIG. 31A) and an isosceles triangle deformed as in FIG. 31B, the absolute intensity of near-field light generated at corner A is stronger when corner B and corner C of the plasmon antenna are rounded than when corner B and corner C of the plasmon antenna are not rounded. The set of Comparative examples 3 to 5 and the set of Examples 11, 16 and 17 exhibited substantially the same trends. This indicates that dependence on the wavelength of the light irradiated onto the plasmon antenna need not be a concern when comparing a plasmon antenna in which corner B and corner C are not rounded with a plasmon antenna in which corner B and corner C are rounded.

Simulations were carried out next to study in more detail the influence of making bilaterally asymmetrical the plan-view shape of the plasmon probe.

As the magnetic recording medium for perpendicular magnetic recording there was used a magnetic recording medium obtained by sequentially stacking, on a glass substrate, a soft magnetic underlayer comprising a CoFe layer (25 nm)/Ru layer (1 nm)/CoFe layer (25 nm), a Ru layer (10 to 20 nm), a CoCrPt recording layer (20 to 30 nm), and a DLC (diamond-like carbon) protective layer. In the simulations, the distance between the magnetic recording medium and the plasmon antenna was 8 nm, the optical spot size of the near-field light irradiated from the plasmon antenna onto the magnetic recording medium was 20 nm, the size of the magnetic recording medium was 3.5 inches, and the revolutions of the magnetic recording medium were 7200 rpm. It is estimated that, under the above conditions, the plasmon antenna can be effectively used for thermally assisted magnetic recording when the near-field light emission intensity irradiated from the plasmon antenna is 650 $(V/m)^2$.

FIG. 38 to FIG. 41 illustrate the conditions of the plasmon antennas in Examples 11 and 16 to 46. As illustrated in FIGS. 38 and 39, the radii of curvature, side AB and material in Examples 11 and 16 to 30 were 10 nm, 150 nm and Au, respectively. In Examples 18 to 20, a was 20 degrees. In Example 18 there was set $\beta=\gamma$, and $\beta \neq \gamma$ in Examples 19 and 20. In Examples 11, 16, 17 and 21, a was 30 degrees. In Example 11 there was set $\beta=\gamma$, and $\beta \neq \gamma$ in Examples 16, 17 and 21. In Examples 22 to 27 α was 45 degrees. In Example 22 there was set β=γ, and β≠γ in Examples 23 to 27. In Examples 28 to 30 α was 55 degrees. In Example 28 there was set β=γ, and β≠γ in Examples 29 and 30.

The conditions in Examples 18 to 20, 11, 16, 17, 21 and 22 to 30 were identical to those of Examples 31 to 46, except for the material of the plasmon antenna. The material of the plasmon antennas of Examples 31 to 46 was Ag.

Figure 42:
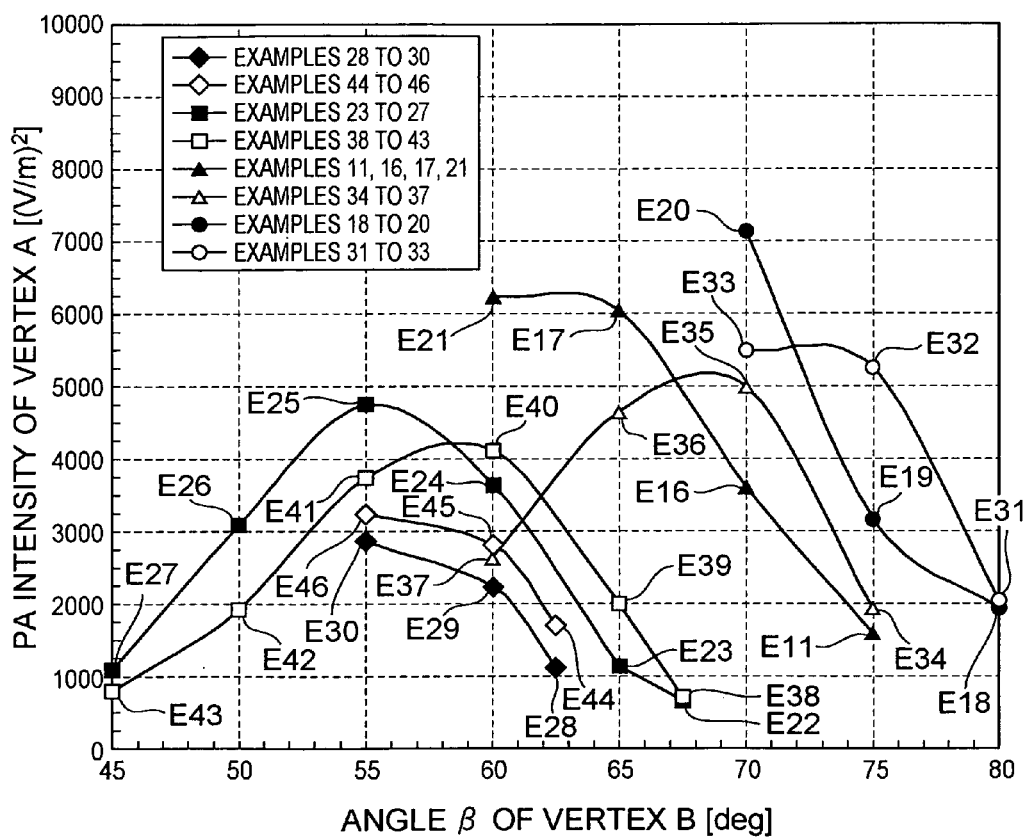
FIG. 42 is a diagram illustrating simulation results in examples.

FIG. 42 illustrates the results of Examples 11 and 16 to 46, plotting the intensity of near-field light generated at corner A versus the interior angle β in the horizontal axis. In the plots of FIG. 42, "E" denotes "Example" and the numerals denote the example number. The examples in which the material of the plasmon antenna is Au are represented by black plots, while the examples in which the material of the plasmon antenna is Ag are represented by white plots. In FIG. 42, moreover, the plots of examples having the same dimension of angle α and the same plasmon antenna material are joined by respective lines. Specifically, the following sets of examples are joined by lines:

Example 18-Example 19-Example 20 (α=20 degrees, material Au)

Example 31-Example 32-Example 22 (α=20 degrees, material Ag)

Example 11-Example 16-Example 17-Example 21 (α=30 degrees, material Au)

Example 34-Example 35-Example 36-Example 37 (α=30 degrees, material Ag)

Example 22-Example 23-Example 24-Example 25-Example 26-Example 27 (α=45 degrees, material Au)

Example 38-Example 39-Example 40-Example 41-Example 42-Example 43 (α=45 degrees, material Ag)

Example 28-Example 29-Example 30 (α=55 degrees, material Au)

Example 44-Example 45-Example 46 (α=55 degrees, material Ag)

In FIG. 42, the plots of Examples 18, 11, 22, 28, 31, 34, 38 and 44, in which the plan-view shape of the plasmon antenna is symmetrical, are each the rightmost plot in the respective sets of plots joined by lines. Upon comparison of data for cases having the same interior angle α of corner A, it was found that the near-field light emission intensity generated at corner A was stronger in examples where the plan-view shape of the plasmon antenna was bilaterally asymmetrical (hereinafter "asymmetrical examples") that in examples where the plan-view shape of the plasmon antenna was bilaterally symmetrical (hereinafter "symmetrical examples"). This showed that the near-field light emission intensity generated at corner A became stronger when the plan-view shape of the plasmon antenna satisfies the relationship (α<β, α<γ and β≠γ) than when the plan-view shape of at the plasmon antenna satisfies the relationship (α<β, α<γ, and β=γ) (that is, when the plan-view shape of the plasmon antenna is asymmetrical rather than when it is symmetrical).

In a comparison of the plasmon antennas in Examples 11 and 16 to 46 having identical α (α=20, 30, 45 or 55 degrees), the near-field light emission intensity generated at corner A was greater in the asymmetrical examples than in the symmetrical examples, in all cases. This indicates that the plasmon antennas satisfy preferably the relationship (α<β, α<γ and β≠γ) and 20 degrees≦α≦55 degrees.

Focusing on the set comprising Example 18-Example 19-Example 20 (α=20 degrees, material Au) of FIG. 42, the near-field light emission intensity generated at corner A is stronger in Example 19 and Example 20 than in Example 18. This indicates that, preferably, the material of the plasmon antenna is Au, and the plan-view shape of the plasmon antenna satisfies, in addition to the relationship (α<β, α<γ and β≠γ), also the relationship (15 degrees≦α≦25 degrees and 70 degrees≦β<80 degrees).

Focusing on the set comprising Example 31-Example 32-Example 22 (α=20 degrees, material Ag) of FIG. 42, the near-field light emission intensity generated at corner A is stronger in Example 32 and Example 22 than in Example 31. This indicates that, preferably, the material of the plasmon antenna is Ag, and the plan-view shape of the plasmon antenna satisfies, in addition to the relationship (α<β, α<γ and β≠γ), also the relationship (15 degrees≦α≦25 degrees and 70 degrees≦β<80 degrees).

Focusing on the set comprising Example 11-Example 16-Example 17-Example 21 (α=30 degrees, material Au) in FIG. 42, the near-field light emission intensity generated at corner A is stronger in Example 16, Example 17 and Example 21 than in Example 11. This indicates that, preferably, the material of the plasmon antenna is Au, and the plan-view shape of the plasmon antenna satisfies, in addition to the relationship (α<β, α<γ and β≠γ), also the relationship (25 degrees≦α≦35 degrees and 60 degrees≦β<75 degrees).

Focusing on the set comprising Example 34-Example 35-Example 36-Example 37 (α=30 degrees, material Ag) in FIG. 42, the near-field light emission intensity generated at corner A is stronger in Example 35, Example 36 and Example 37 than in Example 34. This indicates that, preferably, the material of the plasmon antenna is Ag, and the plan-view shape of the plasmon antenna satisfies, in addition to the relationship (α<β, α<γ and β≠γ), also the relationship (25 degrees≦α≦35 degrees and 60 degrees≦β<75 degrees).

Focusing on the set comprising Example 22-Example 23-Example 24-Example 25-Example 26-Example 27 (α=45 degrees, material Au) in FIG. 42, the near-field light emission intensity generated at corner A is stronger in Example 23, Example 24, Example 25, Example 26 and Example 27 than in Example 22. This indicates that, preferably, the material of the plasmon antenna is Au, and the plan-view shape of the plasmon antenna satisfies, in addition to the relationship (α<β, α<γ and β≠γ), also the relationship (40 degrees≦α≦50 degrees and 45 degrees≦β<67.5 degrees).

Focusing on the set comprising Example 38-Example 39-Example 40-Example 41-Example 42-Example 43 (α=45 degrees, material Ag) in FIG. 42, the near-field light emission intensity generated at corner A is stronger in Example 39, Example 40, Example 41, Example 42 and Example 43 than in Example 38. This indicates that, preferably, the material of the plasmon antenna is Ag, and the plan-view shape of the plasmon antenna satisfies, in addition to the relationship (α<β, α<γ and β≠γ), also the relationship (40 degrees≦α≦50 degrees and 45 degrees≦β<67.5 degrees).

Focusing on the set comprising Example 28-Example 29-Example 30 (α=55 degrees, material Au) of FIG. 42, the near-field light emission intensity generated at corner A is stronger in Example 29 and Example 39 than in Example 28. This indicates that, preferably, the material of the plasmon antenna is Au, and the plan-view shape of the plasmon antenna satisfies, in addition to the relationship (α<β, α<γ and β≠γ), also the relationship (50 degrees≦α≦60 degrees and 55 degrees≦β<62.5 degrees).

Focusing on the set comprising Example 44-Example 45-Example 46 (α=55 degrees, material Ag) of FIG. 42, the near-field light emission intensity generated at corner A is stronger in Example 45 and Example 46 than in Example 44. This indicates that, preferably, the material of the plasmon antenna is Ag, and the plan-view shape of the plasmon antenna satisfies, in addition to the relationship ($\alpha<\beta$, $\alpha<\gamma$ and $\beta\neq\gamma$), also the relationship (50 degrees$\leq\alpha\leq$60 degrees and 55 degrees$\leq\beta<$62.5 degrees).

In the results of Examples 11 and 16 to 46 illustrated in FIG. 42 there was obtained a light intensity no smaller than 650 $(V/m)^2$, which is the light intensity of Example 22. Therefore, it is estimated that the plasmon antenna can be effectively used for thermally assisted magnetic recording if the near-field light emission intensity irradiated from the plasmon antenna is 650 $(V/m)^2$ or greater, at least under the present simulation conditions, which may vary depending on the specifications of the magnetic disk that comprises the magnetic recording medium.

Upon comparison, it was found that forming the plasmon antenna using Au and using Ag elicited virtually the same effect. This indicates that the material used of forming the plasmon antenna is preferably Au or Ag.

What is claimed is:

1. A thermally assisted magnetic head, comprising:
a medium-facing surface;
a main magnetic pole provided on the medium-facing surface; and
a plasmon antenna provided on the medium-facing surface, in the vicinity of the main magnetic pole,
wherein the shape of the plasmon antenna, as viewed from a direction perpendicular to the medium-facing surface, is a triangle having first, second and third corners, the plasmon antenna being shaped as a flat plate the thickness direction of which is perpendicular to the medium-facing surface,
and wherein the distance from the first corner to the main magnetic pole is shorter than the distance from the second corner to the main magnetic pole and the distance from the third corner to the main magnetic pole, and
the second corner and the third corner are rounded.

2. The thermally assisted magnetic head according to claim 1, wherein radii of curvature of the second corner and the third corner range both from 10 nm to 30 nm.

3. The thermally assisted magnetic head according to claim 1, wherein an interior angle $\alpha$ of the first corner, an interior angle $\beta$ of the second corner and an interior angle $\gamma$ of the third corner satisfy the relationship $\alpha<\beta$, $\alpha<\gamma$ and $\beta\neq\gamma$.

4. The thermally assisted magnetic head according to claim 3, wherein the plasmon antenna satisfies the relationship 20 degrees$\leq\alpha\leq$55 degrees.

5. The thermally assisted magnetic head according to claim 1, wherein the plasmon antenna comprises gold or silver.

6. A head gimbal assembly, comprising:
the thermally assisted magnetic head according to claim 1; and
a suspension onto which the thermally assisted magnetic head is mounted.

7. A hard disk drive, comprising:
the head gimbal assembly according to claim 6; and
a magnetic recording medium facing the medium-facing surface.

8. A method for manufacturing a thermally assisted magnetic head having a plasmon antenna shaped as a triangular flat plate as viewed form a direction perpendicular to a medium-facing surface, the method comprising the steps of:
forming a metal layer to be the plasmon antenna on an insulating layer;
forming a first mask layer on part of a stacking surface of the metal layer and etching a region of the stacking surface of the metal layer that is not masked by the first mask layer, to form thereby, in the metal layer, a first inclined surface extending from the stacking surface to the insulating layer;
forming a second mask layer on the first inclined surface and the stacking surface of the metal layer, and etching the second mask layer, to remove the second mask layer from the stacking surface of the metal layer leaving the second mask layer remaining on the first inclined surface; and
forming on the metal layer a second inclined surface extending from the first inclined surface to the insulating layer and defining, with the first inclined surface, an interior angle of a first corner of the plasmon antenna, by further etching the metal layer using as a mask the second mask layer remaining on the first inclined surface,
wherein in the step of forming the first inclined surface, a rounded second corner of the plasmon antenna is formed between the first inclined surface and the stacking surface of the insulating layer, and
in the step of forming the second inclined surface, a rounded third corner of the plasmon antenna is formed between the second inclined surface and the stacking surface of the insulating layer.

9. The method for manufacturing a thermally assisted magnetic head according to claim 8, wherein in the step of forming the first inclined surface and in the step of forming the second inclined surface, the etching rate of the metal layer is greater than the etching rate of the insulating layer.

* * * * *